United States Patent
Chen et al.

(10) Patent No.: US 10,536,892 B2
(45) Date of Patent: Jan. 14, 2020

(54) METHOD AND DEVICE FOR DATA TRANSMISSION

(71) Applicant: CHINA ACADEMY OF TELECOMMUNICATIONS TECHNOLOGY, Beijing (CN)

(72) Inventors: Li Chen, Beijing (CN); Fei Qin, Beijing (CN); Shaoli Kang, Beijing (CN); Bin Jiao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 13 days.

(21) Appl. No.: 15/531,413

(22) PCT Filed: Nov. 10, 2015

(86) PCT No.: PCT/CN2015/094170
§ 371 (c)(1),
(2) Date: May 26, 2017

(87) PCT Pub. No.: WO2016/082676
PCT Pub. Date: Jun. 2, 2016

(65) Prior Publication Data
US 2017/0353906 A1 Dec. 7, 2017

(30) Foreign Application Priority Data
Nov. 28, 2014 (CN) .......................... 2014 1 0715511

(51) Int. Cl.
*H04W 40/02* (2009.01)
*H04W 28/04* (2009.01)
*H04W 72/12* (2009.01)

(52) U.S. Cl.
CPC .......... *H04W 40/02* (2013.01); *H04W 28/04* (2013.01); *H04W 72/1289* (2013.01)

(58) Field of Classification Search
None
See application file for complete search history.

(56) References Cited

U.S. PATENT DOCUMENTS

2010/0027419 A1 2/2010 Padhye et al.
2012/0119902 A1 5/2012 Patro et al.
(Continued)

FOREIGN PATENT DOCUMENTS

CN 101610535 A 12/2009
CN 102497429 A 6/2012
(Continued)

OTHER PUBLICATIONS

Extended European Search Report dated Jun. 25, 2018 for European Patent Application No. 15864130.8.
(Continued)

*Primary Examiner* — Kouroush Mohebbi
(74) *Attorney, Agent, or Firm* — Ladas & Parry, LLP

(57) ABSTRACT

A method and a device for data transmission are provided. A transmission device determines a plurality of wireless links through which data is to be transmitted between the transmission device and a reception device, and transmits physical-layer transmission blocks including identical data packets to the reception device through the determined wireless links.

20 Claims, 6 Drawing Sheets

```
┌─ 101
determining, by a transmission side, a plurality of
wireless links through which data is to be transmitted
between the transmission side and a reception side ↓
┌─ 102
transmitting, by the transmission side, physical-layer
transmission blocks including identical data packets to
the reception side through the determined plurality
of wireless links
```

(56) References Cited

U.S. PATENT DOCUMENTS

| | | | |
|---|---|---|---|
| 2013/0028247 A1 | 1/2013 | Li | |
| 2014/0148152 A1* | 5/2014 | Periyalwar | H04W 88/06 |
| | | | 455/426.1 |
| 2014/0233541 A1 | 8/2014 | Kim et al. | |
| 2018/0220327 A1* | 8/2018 | Karampatsis | H04W 28/0252 |

FOREIGN PATENT DOCUMENTS

| | | |
|---|---|---|
| CN | 103780365 A | 5/2014 |
| CN | 103891182 A | 6/2014 |
| WO | 2013/104413 | 7/2013 |

OTHER PUBLICATIONS

International Preliminary Report on Patentability (Chapter I) for PCT/CN2015/094170 dated May 30, 2017 and its English translation from WIPO.
International Search Report for PCT/CN2015/094170 dated Feb. 2, 2016 and its English translation provided by WIPO.
Written Opinion of the International Search Authority for PCT/CN2015/094170 dated Feb. 2, 2016 and its English translation provided by WIPO.

\* cited by examiner

METHOD AND DEVICE FOR DATA TRANSMISSION

CROSS-REFERENCE TO RELATED APPLICATION

The present application is the U.S. national phase of PCT Application No. PCT/CN2015/094170 filed on Nov. 10, 2015, which claims the priority to Chinese patent application No. 201410715511.1 filed in China on Nov. 28, 2014, the disclosures of which are incorporated herein by reference in their entireties.

TECHNICAL FIELD

The present disclosure relates to a technical field of wireless communication, and specifically to a method and a device for data transmission.

BACKGROUND

With the development of mobile Internet and Internet of Things (IoT), demands on traffic data volume have increased explosively, and mobile communication techniques have been confronted with a new technical challenge from connections among a large amount of devices and diversified IoT services. Time delay and reliability of conventional communication systems are designed with respect to communication among humans. Besides continuing to satisfy demands on the communication among humans in terms of the time delay and the reliability, a future wireless communication system also needs to meet real-time and reliability required by Machine Type Communication (MTC), so as to facilitate new applications in industrial fields such as Transportation Security, Transportation Efficiency, Smart Grids and thereby to make concepts of future smart society and smart planet possible. New application fields require higher performance of the future wireless communication system.

Table 1 shows standards for a Quality of Service (QoS) Class Identifier (QCI) defined by a $3^{rd}$ Generation Partnership Project (3GPP). As shown in Table 1, in the conventional wireless communication system, transmission reliability in case of a stringent requirement on the time delay is usually $10^{-2}$ to $10^{-3}$. For services having a stringent requirement on the reliability, the requirement on the time delay is usually not so strict. Even the most stringent requirement on the time delay is 100 ms for a conversational service, and is 50 ms for a real-time gaming service.

TABLE 1

| QCI | Resource Type | Priority level | Packet delay | Packet error rate | Service application |
|---|---|---|---|---|---|
| 1 | GBR (Guaranteed Bit Rate) | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 5 | Non-GBR (Non Guaranteed Bit Rate) | 1 | 100 ms | $10^{-6}$ | IMS Signalling |
| 6 | | 6 | 300 ms | $10^{-6}$ | Video (Buffered Streaming) TCP-based (e.g., www, e-mail, chat, |

TABLE 1-continued

| QCI | Resource Type | Priority level | Packet delay | Packet error rate | Service application |
|---|---|---|---|---|---|
| 7 | | 7 | 100 ms | $10^{-3}$ | ftp, p2p file sharing, progressive video, etc.) Voice, Video (Live Streaming) Interactive Gaming |
| 8 | | 8 | 300 ms | $10^{-6}$ | Video (Buffered Streaming) TCP-based (e.g., www, e-mail, chat, ftp, p2p file sharing, progressive video, etc.) |
| 9 | | 9 | | | |

With continuous emergence of new applications such as remote industrial control and augmented reality, requirements on the wireless communication system are higher than ever before.

However, the real-time property and the reliability in the conventional wireless communication system are relatively low, and cannot meet the real-time property and the reliability required by new applications such as MTC.

SUMMARY

The present disclosure provides a method and a device for data transmission, so as to solve technical problems in related arts that conventional wireless communication systems provide low real-time property and reliability.

In one aspect, the embodiments of the present disclosure provide a method for data transmission, and the method includes: determining, by a transmission device, a plurality of wireless links through which data is to be transmitted between the transmission device and a reception device; and transmitting, by the transmission device, physical-layer transmission blocks including identical data packets to the reception device through the determined plurality of wireless links.

Optionally, redundancy versions of the physical-layer transmission blocks including the identical data packets are completely or partially the same, or completely different from each other.

Optionally, determining, by the transmission device, a plurality of wireless links through which data is to be transmitted between the transmission device and the reception device includes determining, by a primary physical-layer unit in the transmission device, the plurality of wireless links through which data is to be transmitted between the transmission device and the reception device. Transmitting, by the transmission device, the physical-layer transmission blocks including the identical data packets to the reception device through the determined plurality of wireless links includes: performing, by the primary physical-layer unit, physical-layer treatment to the data packets generated by a user-plane high-layer protocol stack unit, so as to generate a plurality of physical-layer transmission blocks including the identical data packets; transmitting, by the primary physical-layer unit, the physical-layer transmission blocks to physical-layer units corresponding to the plurality of wireless links through which data is to be transmitted, wherein one physical-layer transmission block is transmitted to one physical-layer unit; and transmitting, by physical-layer units corresponding to the wireless links through which data is to be transmitted, the physical-layer transmission blocks including the identical data packets to a UE through the wireless links corresponding to the physical-layer units.

Optionally, in case that the primary physical-layer unit is a primary physical-layer unit corresponding to all of the physical-layer units corresponding to all of the wireless links, the physical-layer units corresponding to the plurality of wireless links through which data is to be transmitted does not include the primary physical-layer unit, or in case that the primary physical-layer unit is one of the physical-layer units in corresponding to all of the wireless links, the physical-layer units corresponding to the plurality of wireless links through which data is to be transmitted include the primary physical-layer unit.

Optionally, the data packets acquired by the primary physical-layer unit are generated by the user-plane high-layer protocol stack unit located at a layer above the primary physical-layer unit.

Optionally, after transmitting, by the transmission device, the plurality of physical transmission blocks including the identical data packets to the reception device through the determined plurality of wireless links, the method further includes: in case that retransmission is needed, determining, by the primary physical-layer unit, whether or not there is a wireless link for which the number of retransmission times reaches a maximum value corresponding to the wireless link; and in case that there is the wireless link for which the number of retransmission times has reached the maximum value, transmitting, by the primary physical-layer unit, all of the physical-layer transmission blocks to physical-layer units corresponding to the plurality of wireless links through which data is to be transmitted other than a physical-layer unit corresponding to the wireless link for which the number of retransmission times has reached the maximum value, wherein one physical-layer transmission block is transmitted to one physical-layer unit.

Optionally, in case that the transmission device is a network-side device, the reception device is a UE, and in case that the transmission device is a UE, the reception device is a network-side device.

Optionally, the transmission device is the network-side device, and before transmitting, by the transmission device, the physical-layer transmission blocks including the identical data packets to the reception device through the determined plurality of wireless links, the method further includes transmitting, by the network-side device, a downlink scheduling command to the UE, so as to instruct the UE to receive data through the plurality of wireless links.

Optionally, the transmission device is the UE, and determining, by the transmission device, a plurality of wireless links through which data is to be transmitted between the transmission device and the reception device includes determining, by the UE, the plurality of wireless links through which data is to be transmitted between the UE and a network-side device in accordance with a scheduling command from the network-side device.

In another aspect, the embodiments of the present disclosure provide a method for data transmission, including: determining, by a reception device, a plurality of wireless links through which data is to be transmitted between the reception device and a transmission device; and receiving, by the reception device, physical-layer transmission blocks including identical data packets from the transmission device through the determined plurality of wireless links.

Optionally, redundancy versions of the physical-layer transmission blocks including the identical data packets are completely or partially the same, or completely different from each other.

Optionally, after receiving, by the reception device, the physical-layer transmission blocks including the identical data packets from the transmission device through the determined plurality of wireless links, the method further includes combining and decoding, by the reception device, the physical-layer transmission blocks received through the plurality of wireless links.

Optionally, after receiving, by the reception device, the physical-layer transmission blocks including the identical data packets from the transmission device through the determined plurality of wireless links, the method further includes transmitting, by the reception device, feedback information through at least one of the plurality of wireless links.

Optionally, in case that the transmission device is a network-side device, the reception device is a UE, and in case that the transmission device is a UE, the reception device is a network-side device.

Optionally, the reception device is the UE, and determining, by the reception device, a plurality of wireless links through which data is to be transmitted between the reception device and the transmission device includes determining, by the UE, the plurality of wireless links through which data is to be transmitted between the UE and the network-side device in accordance with a scheduling command from the network-side device.

Optionally, the reception device is the network-side device, and after determining, by the reception device, a plurality of wireless links through which data is to be transmitted between the reception device and the transmission device, the method further includes transmitting, by the network-side device, an uplink scheduling command to the UE so as to instruct the UE to transmit data through the plurality of wireless links.

In yet another aspect, the embodiments of the present disclosure provide a transmission device for data transmission, and the transmission device includes a user-plane high-layer protocol stack unit, a primary physical-layer unit and a plurality of physical-layer units. The user-plane high-layer protocol stack unit is configured to generate data packets to be transmitted. The primary physical-layer unit is configured to determine a plurality of wireless links through which data is to be transmitted between the transmission device and a reception device; perform physical-layer treatment to the data packets generated by the user-plane high-layer protocol stack unit to generate a plurality of physical-layer transmission blocks including identical data packets, and transmit all of the physical-layer transmission blocks to physical-layer units corresponding to the plurality of wireless links through which data is to be transmitted. Each of the plurality of physical-layer units is configured to, upon receipt of the physical-layer transmission block, transmit the physical-layer transmission block to the reception device through a wireless link corresponding to the physical-layer unit.

Optionally, redundancy versions of the physical-layer transmission blocks including the identical data packets are completely or partially the same, or completely different from each other.

Optionally, the primary physical-layer unit is further configured to, in case that retransmission is needed, determine whether or not there is a wireless link for which the number of retransmission times reaches a maximum value corresponding to the wireless link, and in case that there is the wireless link for which the number of retransmission times has reached the maximum value, transmit all of the physical-layer transmission blocks to physical-layer units corresponding to the plurality of wireless links through which data is to be transmitted other than a physical-layer unit corresponding to the wireless link for which the number of retransmission times has reached the maximum value. One physical-layer transmission block is transmitted to one physical-layer unit.

Optionally, in case that the transmission device is a network-side device, the reception device is a UE, and in case that the transmission device is a UE, the reception device is a network-side device.

Optionally, the transmission device is the network-side device, and the primary physical-layer unit is further configured to, before transmitting the physical-layer transmission blocks including the identical data packets to the reception device through the determined plurality of wireless links, transmit a downlink scheduling command to the UE, so as to instruct the UE to receive data through the plurality of wireless links.

Optionally, the transmission device is the UE, and the primary physical-layer unit is further configured to determine the plurality of wireless links through which data is to be transmitted between the UE and a network-side device in accordance with a scheduling command from the network-side device.

In still yet another aspect, the embodiments of the present disclosure provide a transmission device for data transmission, and the transmission device includes a user-plane high-layer protocol stack unit and a physical-layer unit. The user-plane high-layer protocol stack unit is configured to generate data packets to be transmitted. The physical-layer unit is configured to: in case of being determined as a primary physical-layer unit, determine a plurality of wireless links through which data is to be transmitted between the transmission device and the reception device, perform physical-layer treatment to the data packets generated by the user-plane high-layer protocol stack unit to generate a plurality of physical-layer transmission blocks including identical data packets, transmit the plurality of physical-layer transmission blocks to other physical-layer units corresponding to the plurality of wireless links through which data is to be transmitted, and transmit one physical-layer transmission block including the identical data packets through one of the plurality of wireless links connected to the physical-layer unit; and in case of not being determined as the primary physical-layer unit, transmit the physical-layer transmission block received from the primary physical-layer unit through the wireless link connected to the physical-layer unit.

Optionally, redundancy versions of the physical-layer transmission blocks including the identical data packets are completely or partially the same, or completely different from each other.

Optionally, the physical-layer unit is further configured to, in case of being determined as the primary physical-layer unit and retransmission is needed, determine whether or not there is a wireless link for which the number of retransmission times reaches a maximum value corresponding to the wireless link; and in case that there is the wireless link for which the number of retransmission times has reached the maximum value, transmit all of the physical-layer transmission blocks to physical-layer units corresponding to the plurality of wireless links through which data is to be transmitted other than a physical-layer unit corresponding to the wireless link for which the number of retransmission times has reached the maximum value. One physical-layer transmission block is transmitted to one physical-layer unit.

Optionally, the physical-layer unit is further configured to, in case of being determined as the primary physical-layer unit and in case that retransmission is needed, determine whether or not the number of its own retransmission times reaches a maximum value corresponding to the physical-layer unit, and in case that the number of its own retransmission times has reached the maximum value, stop the retransmission, and in case that the number of its own retransmission times does not reach the maximum value, continue to transmit one physical-layer transmission block including the identical data packets through a wireless link connected to the physical-layer unit.

Optionally, in case that the transmission device is a network-side device, the reception device is a UE, and in case that the transmission device is a UE, the reception device is a network-side device.

Optionally, the transmission device is the network-side device, and the physical-layer unit is further configured to, after being determined as the primary physical-layer unit and before transmitting the physical-layer transmission blocks including the identical data packets to the UE through the determined plurality of wireless links, transmit a downlink scheduling command to the UE, so as to instruct the UE to receive data through the plurality of wireless links.

Optionally, the transmission device is the UE, and the physical-layer unit is further configured to, after being determined as the primary physical-layer unit, determine the plurality of wireless links through which data is to be transmitted between the UE and the network-side device in accordance with a scheduling command from the network-side device.

In still yet another aspect, the embodiments of the present disclosure provide a transmission device for data transmission, and the transmission device includes a plurality of user-plane high-layer protocol stack units and a plurality of physical-layer units. Each of the user-plane high-layer protocol stack units is connected to a corresponding one of the plurality of physical-layer units, and the user-plane high-layer protocol stack units are arranged in one-to-one correspondence with the physical-layer units. Each of the user-plane high-layer protocol stack units is configured to generate data packets to be transmitted. Each of the physical-layer units is configured to: after being determined as a primary physical-layer unit, determine a plurality of wireless links through which data is to be transmitted between the transmission device and a reception device; perform physical-layer treatment to the data packets generated by one of the user-plane high-layer protocol stack units corresponding to the physical-layer unit so as to generate a plurality of physical-layer transmission blocks including identical data packets, transmit the physical-layer transmission blocks to other physical-layer units corresponding to ones of the wireless links through which data is to be transmitted, and transmit one physical-layer transmission block including the identical data packets through one of the wireless links connected to the physical-layer unit; and after not being determined as the primary physical-layer unit, transmit the physical-layer transmission block received from the primary physical-layer unit through the wireless link connected to the physical-layer unit.

Optionally, redundancy versions of the physical-layer transmission blocks including the identical data packets are completely or partially the same, or completely different from each other.

Optionally, each of the physical-layer units is further configured to, in case of being determined as the primary physical-layer unit and retransmission is needed, determine whether or not there is a wireless link for which the number of retransmission times reaches a maximum value corresponding to the wireless link; and in case that there is the wireless link for which the number of retransmission times has reached the maximum value, transmit all of the physical-layer transmission blocks to ones of the plurality of physical-layer units corresponding to the plurality of wireless links through which data is to be transmitted other than a physical-layer unit corresponding to the wireless link for which the number of retransmission times has reached the maximum value. One physical-layer transmission block is transmitted to one physical-layer unit.

Optionally, each of the physical-layer units is further configured to, in case of being determined as the primary physical-layer unit and retransmission is needed, determine whether or not the number of its own retransmission times reaches a maximum value corresponding to the primary physical-layer unit, and in case that the number of its own retransmission times has reached the maximum value, stop the retransmission, otherwise, continue to transmit one physical-layer transmission block including the identical data packets through a wireless link connected to the physical-layer unit.

Optionally, in case that the transmission device is the network-side device, the reception device is a UE, and in case that the transmission device is a UE, the reception device is a network-side device.

Optionally, the transmission device is the network-side device, and each of the physical-layer units is further configured to, after being determined as the primary physical-layer unit and before transmitting the physical-layer transmission blocks including the identical data packets to the UE through the determined plurality of wireless links, transmit a downlink scheduling command to the UE, so as to instruct the UE to receive data through the plurality of wireless links.

Optionally, the transmission device is the UE, and each of the plurality of physical-layer units is further configured to, after being determined as the primary physical-layer unit, determine the plurality of wireless links through which data is to be transmitted between the UE and the network-side device in accordance with a scheduling command from the network-side device.

In still yet another aspect, the embodiments of the present disclosure provide a reception device for data transmission, and the reception device includes a plurality of physical-layer units, a primary physical-layer unit, and a user-plane high-layer protocol stack unit. Each of the physical-layer unit is configured to receive a physical-layer transmission block through a wireless link corresponding to the physical-layer unit in a plurality of wireless links through which data is to be transmitted between the reception device and the transmission device, and report the received physical-layer transmission block to the primary physical-layer unit. The physical-layer transmission block transmitted through each wireless link includes identical data packets. The primary physical-layer unit is configured to receive the physical-layer transmission blocks reported by other physical-layer units corresponding to other wireless links in the plurality of wireless links through which data is to be transmitted between the reception device and the transmission device, combine and decode the physical-layer transmission block received by the primary physical-layer unit and the physical-layer transmission blocks reported by the other physical-layer units, and after the decoding is performed successfully, report resultant data packets to the user-plane high-layer protocol stack unit. The user-plane high-layer protocol stack unit is configured to receive the data packets from the primary physical-layer unit.

Optionally, the primary physical-layer unit is further configured to notify at least one of the physical-layer units to transmit feedback information through the wireless links corresponding to the at least one physical-layer unit in accordance with a result of the combining and decoding.

Optionally, in case that the transmission device is a network-side device, the reception device is a UE, and in case that the transmission device is a UE, the reception device is a network-side device.

Optionally, the reception device is the UE, and the primary physical-layer unit is further configured to determine the plurality of wireless links through which data is to be transmitted between the UE and the network-side device in accordance with a scheduling command from the network-side device.

Optionally, the reception device is the network-side device, and the primary physical-layer unit is further configured to determine the plurality of wireless links through which data is to be transmitted between the network-side device and the UE, and transmit an uplink scheduling command to the UE, so as to instruct the UE to transmit data through the plurality of wireless links.

In still yet another aspect, the embodiments of the present disclosure provide a reception device for data transmission including a physical-layer unit and a user-plane high-layer protocol stack unit. The physical-layer unit is configured to: receive a physical-layer transmission block through a wireless link corresponding to the physical-layer unit in a plurality of wireless links through which data is to be transmitted between the reception device and a transmission device, wherein the physical-layer transmission blocks transmitted through the plurality of wireless links include identical data packets; in case that the physical-layer unit is a primary physical-layer unit, receive physical-layer transmission blocks reported by other physical-layer units corresponding to other wireless links in the plurality of wireless links through which data is to be transmitted between the reception device and the transmission device, combine and decode the physical-layer transmission block received by the primary physical-layer unit and the physical-layer transmission blocks reported by the other physical-layer units, and after the decoding is performed successfully, report resultant data packets to the user-plane high-layer protocol stack unit; and in case that the physical-layer unit is not the primary physical-layer unit, report the received physical-layer transmission block to the primary physical-layer unit. The user-plane high-layer protocol stack unit is configured to receive the data packets from the physical-layer unit.

Optionally, in case that the physical-layer unit is the primary physical-layer unit, it is further configured to, in accordance with a result of the combining and decoding, transmit feedback information through the wireless link corresponding to the primary physical-layer unit, and/or notify the other physical-layer units to transmit feedback information through the wireless links corresponding to the other physical-layer units.

Optionally, in case that the transmission device is a network-side device, the reception device is a UE, and in case that the transmission device is a UE, the reception device is a network-side device.

Optionally, the reception device is a UE, and the physical-layer unit is further configured to determine the plurality of wireless links through which data is to be transmitted between the UE and the network-side device in accordance with a scheduling command from the network-side device.

Optionally, the reception device is the network-side device, and the physical-layer unit is further configured to determine the plurality of wireless links through which data is to be transmitted between the network-side device and the UE, and transmit an uplink scheduling command to the UE, so as to instruct the UE to transmit data through the plurality of wireless links.

In still yet another aspect, the embodiments of the present disclosure provide a reception device for data transmission, and the reception device includes a plurality of user-plane high-layer protocol stack units and a plurality of physical-layer units. Each of the user-plane high-layer protocol stack units is connected to a corresponding one of the physical-layer units, and the user-plane high-layer protocol stack units are arranged in one-to-one correspondence with the physical-layer units. Each of the physical-layer units is configured to: receive a physical-layer transmission block through a wireless link corresponding to the physical-layer unit in a plurality of wireless links through which data is to be transmitted between the reception device and a transmission device, wherein the physical-layer transmission blocks transmitted through the plurality of wireless links include identical data packets; in case that the physical-layer unit is a primary physical-layer unit, receive physical-layer transmission blocks reported by other physical-layer units corresponding to other wireless links in the plurality of wireless links through which data is to be transmitted between the reception device and the transmission device, combine and decode the physical-layer transmission block received by the physical-layer unit and the physical-layer transmission blocks reported by the other physical-layer units, and after the decoding is performed successfully, report resultant data packets to one of the user-plane high-layer protocol stack units corresponding to the physical-layer unit; and in case that the physical-layer unit is not the primary physical-layer unit, report the received physical-layer transmission block to the primary physical-layer unit. Each of the user-plane high-layer protocol stack units is configured to receive the data packets from one of the physical-layer units corresponding to the user-plane high-layer protocol stack unit.

Optionally, in case that the physical-layer unit is the primary physical-layer unit, it is further configured to, in accordance with a result of the combining and decoding, transmit feedback information through the wireless link corresponding to the primary physical-layer unit, and/or notify the other physical-layer units to transmit feedback information through the wireless links corresponding to the other physical-layer units.

Optionally, in case that the transmission device is a network-side device, the reception device is a UE, and in case that the transmission device is a UE, the reception device is a network-side device.

Optionally, the reception device is the UE, and each of the plurality of physical-layer units is further configured to determine the plurality of wireless links through which data is to be transmitted between the UE and the network-side device in accordance with a scheduling command from the network-side device.

Optionally, the reception device is the network-side device, and each of the plurality of physical-layer units is further configured to determine the plurality of wireless links through which data is to be transmitted between the network-side device and the UE, and transmit an uplink scheduling command to the UE, so as to instruct the UE to transmit data through the plurality of wireless links.

In still yet another aspect, the embodiments of the present disclosure provide a transmission device for data transmission including a processor, a memory and a transceiver. The processor is connected to the transceiver, and configured to read programs stored in the memory, so as to: determine a plurality of wireless links through which data is to be transmitted between the transmission device and a reception device; and transmit physical-layer transmission blocks including an identical data packets to the reception device through the determined plurality of wireless links.

In still yet another aspect, the embodiments of the present disclosure provide a reception device for data transmission including a processor, a memory and a transceiver. The processor is connected to the transceiver, and configured to read programs stored in the memory, so as to: determine a plurality of wireless links through which data is to be transmitted between the reception device and a transmission device; and receive physical-layer transmission blocks including identical data packets from the transmission device through the determined plurality of wireless link.

The transmission device provided in the embodiments of the present disclosure may determine the plurality of wireless links through which data is to be transmitted between the transmission device and the reception device, and transmit the physical-layer transmission blocks including the identical data packets to the reception device through the determined plurality of wireless links. Since the physical-layer transmission blocks including the identical data packets are transmitted through different wireless links, resources for different wireless channels connected to the reception device may be fully utilized, thereby to improve the real-time property and the reliability and meet requirements on the real-time property and reliability by new applications such as MTC in a better manner, as compared with the conventional wireless communication systems.

DETAILED DESCRIPTION OF THE EMBODIMENTS

According to the embodiments of the present disclosure, a transmission side may determine a plurality of wireless links through which data is to be transmitted between the transmission side and a reception side, and transmit physical-layer transmission blocks including identical data packets to the reception side through the determined plurality of wireless links. Because the physical-layer transmission blocks including the identical data packets are transmitted through different wireless links, resources for different wireless links at the reception side may be used sufficiently, thereby improving the real-time property and the reliability. Requirements on the real-time property and the reliability by new applications such as the MTC may be fulfilled in a better manner, as compared with the conventional wireless communication system.

Embodiments of the present disclosure will be described in details hereinafter in conjunction with the drawings.

Figure 1:
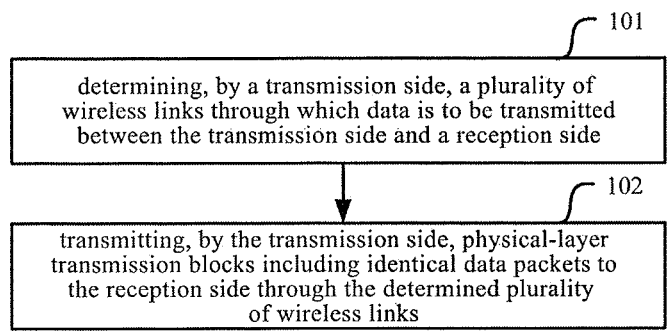
FIG. 1 is a flow chart of a method for data transmission according to embodiments of the present disclosure.

As shown in FIG. 1, the present disclosure provides a method for data transmission, which includes Step 101 and Step 102.

Step 101: determining, by a transmission side, a plurality of wireless links through which data is to be transmitted between the transmission side and a reception side.

Step 102: transmitting, by the transmission side, physical-layer transmission blocks including identical data packets to the reception side through the determined plurality of wireless links.

Two types of protocol-stack architecture are provided in the embodiments of the present disclosure.

Figure 2:
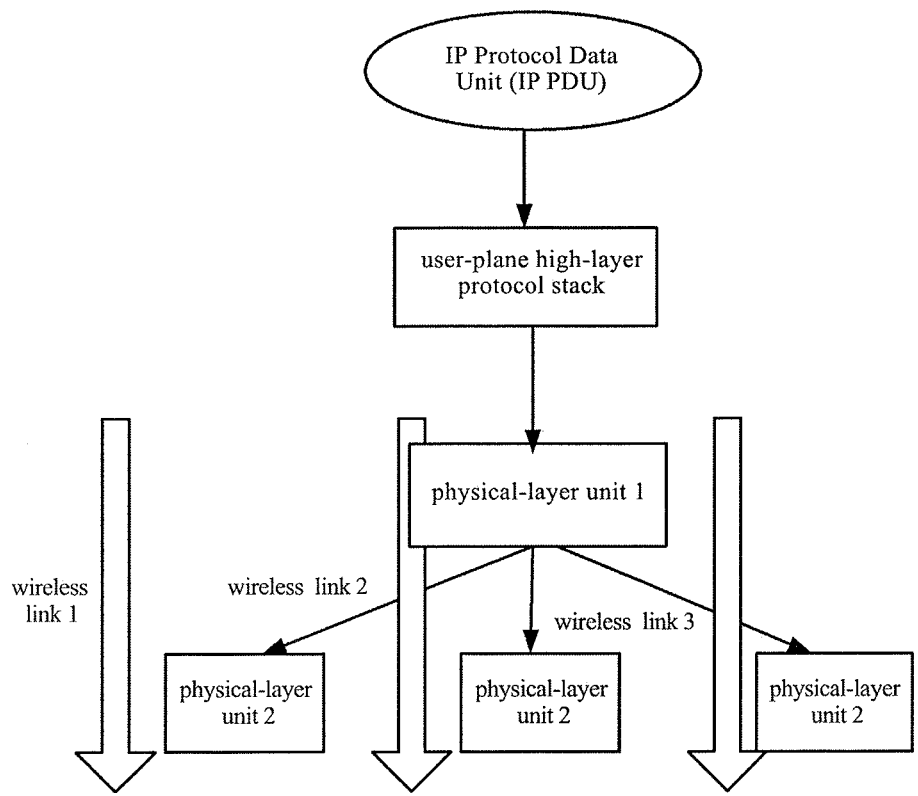
FIG. 2 is a schematic diagram of an architecture of a first protocol stack according to embodiments of the present disclosure.

A first type: as shown in FIG. 2, in the first type of protocol sack architecture provided by the present disclosure, each transmission channel may adopt a user-plane high-layer protocol stack (Packet Data Convergence Protocol (PDCP), Radio Link Control (RLC) and Medium Access Control (MAC) layers) and a physical-layer unit 1 (i.e., a primary physical-layer unit). The user-plane high-layer protocol stack may generate data packets (e.g., a Medium Access Control Packet Data Unit (MAC PDU)). The physical-layer unit 1 may perform physical-layer treatment (e.g., Cyclic Redundancy Check (CRC) addition, channel encoding, multiplexing, interleaving, or the like) to the data packets, so as to generate a plurality of physical-layer transmission blocks including identical data packets, and send the plurality of physical-layer transmission blocks to a plurality of physical-layer units 2 corresponding to different wireless links, respectively. Then, the plurality of physical-layer transmission blocks may be transmitted by the plurality of physical-layer units 2 through the different wireless links, respectively.

Specifically, the physical-layer unit 1 (i.e., the primary physical-layer unit) may determine the plurality of wireless links through which data is to be transmitted between a transmission side and a reception side, and perform physical-layer treatment to the data packets generated by the user-plane high-layer protocol stack, so as to generate the plurality of physical-layer transmission blocks including the identical data packets. Then, the primary physical-layer unit may transmit all of the plurality of physical-layer transmission blocks to the plurality of physical-layer units corresponding to the different wireless links through which data is to be transmitted, and one physical-layer transmission block may be transmitted to one physical-layer unit. Next, each physical-layer unit corresponding to one wireless link through which data is to be transmitted may transmit the physical-layer transmission block including the identical data packets to the reception side through one of the wireless links corresponding to the physical-layer unit.

In case of the first type of protocol-stack architecture, the primary physical-layer unit is a physical-layer unit corresponding to all of the physical-layer units in all transmission channels, and the plurality of physical-layer units corresponding to the plurality of wireless links through which data is to be transmitted may not include the primary physical-layer unit.

For downlink transmission, a network-side entity may include one user-plane high-layer protocol stack (PDCP, PLC and MAC layers) and one physical-layer unit 1 (i.e., the primary physical-layer unit). The user-plane high-layer protocol stack may generate data packets (e.g., MAC PDU). The physical-layer unit 1 may perform physical-layer treatment (e.g., CRC addition, channel encoding, multiplexing, interleaving, or the like) to the data packets, so as to generate a plurality of physical-layer transmission blocks including identical data packets and send the plurality of physical-layer transmission blocks to the plurality of physical-layer unit 2 in cells. Then, the physical-layer transmission blocks may be transmitted by different physical-layer units 2 through different wireless links.

For uplink transmission, a User Equipment (UE) may have one user-plane high-layer protocol stack (PDCP, RLC and MAC layers) and one physical-layer unit 1 (i.e., the primary physical-layer unit). The user-plane high-layer protocol stack may generate data packets (e.g., MAC PDU). The physical-layer unit 1 may perform physical-layer treatment (e.g., CRC addition, channel encoding, multiplexing, interleaving, or the like) to the data packets, so as to generate a plurality of physical-layer transmission blocks including identical data packets and send the plurality of physical-layer transmission blocks to the physical-layer units 2 corresponding to the wireless links. Then, the physical-layer transmission blocks may be transmitted by different physical-layer units 2 through different wireless links.

Figure 3:
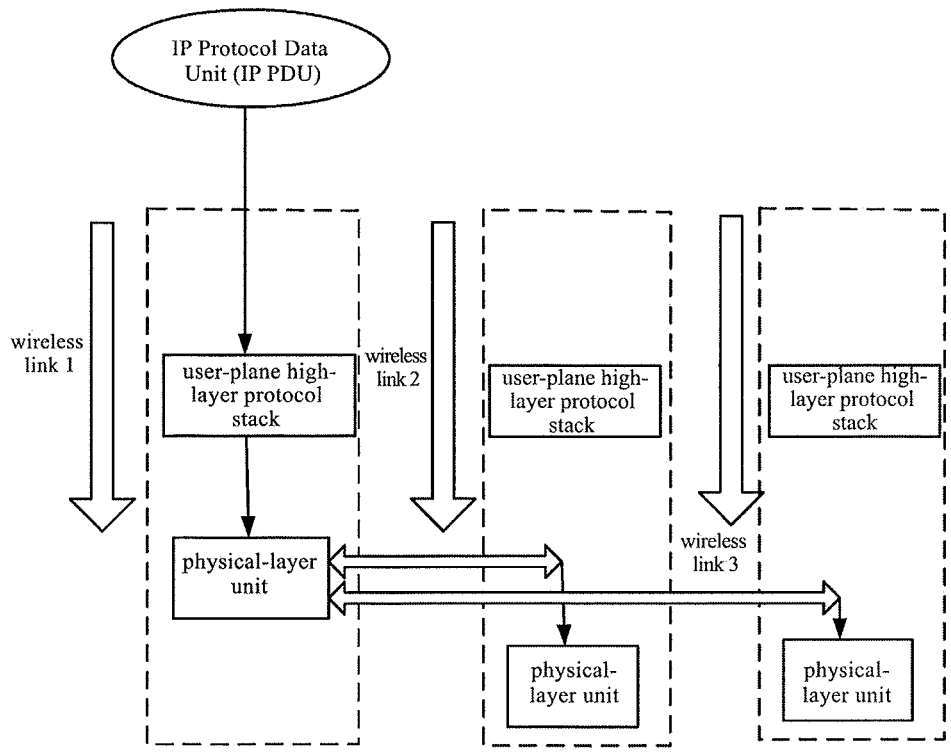
FIG. 3 is a schematic diagram of an architecture of a second protocol stack according to embodiments of the present disclosure.

A second type: as shown in FIG. 3, in the second type of protocol-stack architecture provided by the embodiments of the present disclosure, one wireless link may be selected from a plurality of wireless links as a primary wireless link, and a physical-layer unit corresponding to the primary wireless link may be set as a primary physical-layer unit. The user-plane high-layer protocol stack may generate data packets (e.g., MAC PDU). The physical-layer unit 1 may perform physical-layer treatment (e.g., CRC addition, channel encoding, multiplexing, interleaving or the like) to the data packets, so as to generate a plurality of physical-layer transmission blocks including identical data packets and send the plurality of physical-layer transmission blocks to a plurality of physical-layer units 2 corresponding to different wireless links.

The primary wireless link may be pre-selected, e.g., a wireless link with higher connectivity reliability, larger coverage and a subscription function may be selected as the primary wireless link. For example, for a Long Term Evolution (LTE)+Wireless Fidelity (WiFi) system, the primary wireless link may usually be an LTE link.

Specifically, at the transmission side, the primary physical-layer unit may determine the plurality of wireless links through which data is to be transmitted between the transmission side and the reception side, and perform physical-layer treatment to data packets generated by the user-plane high-layer protocol stack, so as to generate the plurality of physical-layer transmission blocks including identical data packets. Then, the primary physical-layer unit may transmit all of the physical-layer transmission blocks to the physical-layer units corresponding to the plurality of wireless links through which data is to be transmitted, and one physical-layer transmission block may be transmitted to one physical-layer unit. Next, the physical-layer unit corresponding to the wireless links through which data is to be transmitted may transmit the physical-layer transmission blocks including identical data packets to the reception side through the wireless links corresponding to the physical-layer unit.

In case of a second type of protocol-stack architecture, the primary physical-layer unit may be one of all physical-layer units in all transmission channels, and the physical-layer units corresponding to the plurality of wireless links through which data is to be transmitted may include the primary physical-layer unit.

For the downlink transmission, each network-side entity may have a user-plane high-layer protocol stack and a set of physical-layer units, and one of the set of physical-layer units connected to a primary wireless link may be set as the primary physical-layer unit. The user-plane high-layer protocol stack of the primary physical-layer unit may generate data packets (e.g., MAC PDU). The primary physical-layer unit may perform physical-layer treatment (e.g., CRC addition, channel encoding, multiplexing, interleaving or the like) to the data packets, so as to generate a plurality of physical-layer transmission blocks including identical data packets, and send the plurality of physical-layer transmission blocks to different network-side entities through interfaces between network-side entities (e.g., in case that the network-side entities are base stations, interfaces between the base station, usually X2 interfaces). Then, each of the physical-layer units (including the primary physical-layer unit) may transmit the physical-layer transmission block through a wireless link corresponding to the physical-layer unit.

For the uplink transmission, a UE may have a user-plane high-layer protocol stack and a set of physical-layer units (e.g., in case that the UE includes two wireless links, each wireless link may correspond to the user-plane high-layer protocol stack and one of the physical-layer units), and one of the physical-layer units connected to a primary wireless link may be set as a primary physical-layer unit. The user-plane high-layer protocol stack corresponding to the primary physical-layer unit may generate data packets (e.g., MAC PDU). The primary physical-layer unit may perform physical-layer treatment (e.g., CRC addition, channel encoding, multiplexing, interleaving or the like) to the data packets, so as to generate a plurality of physical-layer transmission blocks including identical data packets, and send the plurality of physical-layer transmission blocks to different physical-layer units through an interface inside the UE. Each physical-layer unit (including the primary physical-layer unit) may transmit a physical-layer transmission block through a wireless link corresponding to the physical-layer unit.

Optionally, redundancy versions of the physical-layer transmission blocks including the identical data packets are completely or partially the same, or completely different. For different wireless links, the redundancy versions may be set through a protocol, e.g., the redundancy versions of the physical-layer transmission blocks for wireless links 1, 2, 3 may be set as 0, 2, 1, respectively.

Specifically, in case that the primary physical-layer unit performs the physical-layer treatment (e.g., CRC addition, channel encoding, multiplexing, interleaving or the like) to the data packets so as to generate the plurality of physical-layer transmission blocks including the identical data packets and the redundancy versions of the physical-layer transmission blocks including the identical data packets need to be completely the same, the plurality of physical-layer transmission blocks which include the identical data packets and redundancy versions of which are completely the same, may be generated. In case that the redundancy versions of the physical-layer transmission blocks including the identical data packets need to be partially the same, the plurality of physical-layer transmission blocks which include the identical data packets and redundancy versions of which are partially the same, may be generated. In case that the redundancy versions of the physical-layer transmission blocks including the identical data packets need to be completely different, the plurality of physical-layer transmission blocks which include the identical data packets and redundancy versions of which are completely different, may be generated.

In case that the MAC PDU is subjected to the physical-layer treatment (e.g., channel encoding, multiplexing, interleaving or the like) to generate the physical-layer transmission blocks in the embodiments of the present disclosure, resources to be used may be determined in accordance with an experience value or a conservative value or resources allocated by a base station in a primary cell to which the UE belongs.

In practice, parameters for multiple transmission channels may be configured for the UE at a network side through high-layer signaling (usually Radio Resource Control (RRC) signaling). These configurations may include, but not limited to, one or more of: wireless links which engage in the multiple transmission channels, configuration of the primary cell, configuration of feedback resources, and maximum transmission times. These configurations may be performed by the physical-layer units or other units.

Optionally, in case that the transmission side is the network side, the parameters for multiple transmission channels may be configured for the UE by the primary physical-layer unit through the high-layer signaling (usually the RRC signaling). For example, the primary physical-layer unit may transmit a downlink scheduling command to the UE, so as to instruct the UE to receive data through a plurality of wireless links. In practice, in case of the protocol-stack architecture in FIG. 2, the primary physical-layer unit may notify a physical-layer unit corresponding to a cell serving the UE, and in case of the protocol-stack architecture in FIG. 3, the primary physical-layer unit may notify a physical-layer unit corresponding to a base station serving the UE.

When scheduling, the scheduling command may also be transmitted in a primary cell for the UE besides being transmitted by the primary physical-layer unit. One scheduling command may indicate transmission on a plurality of wireless links. The scheduling command may indicate that an identical time-frequency resource position is used by wireless links carrying physical resource blocks (PRBs) (a time-frequency resource position refers to PBRs on available resources, rather a specific sub-carrier frequency), or the scheduling command may indicate the time-frequency resource positions for different wireless links separately, i.e., different time-frequency resource positions are used by the wireless links carrying the PRBs.

In case that the transmission side is the UE, the UE may determine the plurality of wireless links through which data is to be transmitted between the UE and the network side, in accordance with a scheduling command from the network side.

Optionally, in case that retransmission is needed, the primary physical-layer unit is further configured to determine whether or not there is a wireless link for which the number of retransmission times reaches a maximum value corresponding to the wireless link; and in case that there is the wireless link for which the number of retransmission times reaches the maximum value, the primary physical-layer unit transmits all of the physical-layer transmission blocks to physical-layer units corresponding to the plurality of wireless links through which data is to be transmitted other than the physical-layer unit corresponding to the wireless link for which the number of retransmission times reaches the maximum value. One physical-layer transmission block is transmitted to one physical-layer unit.

For the second type of protocol-stack architecture, in case that retransmission is needed, the primary physical-layer unit may determine whether or not the number of its own retransmission times reaches a maximum value corresponding to the primary physical-layer unit; in case that the maximum value is reached, stopping its own retransmission, otherwise, continuing to transmit one physical-layer transmission block including the identical data packets through the wireless link connected to the primary physical-layer unit.

The maximum value of the number of retransmission times corresponding to each wireless link may be completely or partially identical, or completely different from each other.

Figure 4:
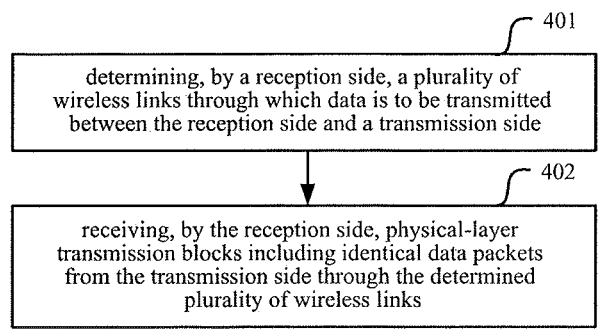
FIG. 4 is a flow chart of a method for data transmission according to embodiments of the present disclosure.

As shown in FIG. 4, the embodiments of the present disclosure further provide a method for data transmission, which includes Step 401 and Step 402.

Step 401: determining, by a reception side, a plurality of wireless links through which data is to be transmitted between the reception side and a transmission side.

Step 402: receiving, by the reception side, physical-layer transmission blocks including identical data packets from the transmission device through the determined plurality of wireless links.

Redundancy versions of the physical-layer transmission blocks including the identical data packets are completely or partially identical, or completely different.

Optionally, the method further includes, after receiving, by the reception side, the physical-layer transmission blocks including the identical data packets from the transmission side through the determined plurality of wireless links, combining and decoding, by the reception side, the physical-layer transmission blocks received through the wireless links.

Optionally, the method further includes, after receiving, by the reception side, the physical-layer transmission blocks including the identical data packets from the transmission side through the determined plurality of wireless links, transmitting, by the reception side, feedback information through at least one wireless link.

The feedback information may be transmitted merely through one wireless link, e.g., a wireless link of a primary cell serving a UE, or an Acknowledgement (ACK) may be transmitted through each of the wireless links after the physical-layer transmission blocks have been decoded successfully.

In case that the transmission side is a network side, the reception side is a UE, and in case that the transmission side is the UE, the reception side is the network side.

For the protocol-stack architecture in FIG. 2, the reception side is the network side or the UE. In case that the reception side is the network side, the physical-layer transmission blocks may be received by the physical-layer units arranged in a distributed or centralized manner (each physical-layer unit may be a separate entity), and then processed by the primary physical-layer unit.

Each physical-layer unit at the reception side is configured to receive the physical-layer transmission block through a wireless link corresponding thereto in the plurality of wireless links through which data is to be transmitted between the reception side and the transmission side, and report the received physical-layer transmission block to the primary physical-layer unit. The physical-layer transmission block transmitted through each of the wireless links includes identical data packets. Specifically, each physical-layer unit may report the received physical-layer transmission block to the primary physical-layer unit through an internal interface at the transmission side.

The primary physical-layer unit at the reception side is configured to receive physical-layer transmission blocks reported by physical-layer units corresponding to other wireless links in the plurality of wireless links through which data is to be transmitted between the reception side and the transmission side, and combine and decode the physical-layer transmission block received by the primary physical-layer unit and the physical-layer transmission blocks reported by other physical-layer units.

The primary physical-layer unit notifies at least one of the physical-layer units to transmit feedback information through a wireless link corresponding to the at least one physical-layer unit in accordance with a result of the combining and decoding.

For the protocol-stack architecture in FIG. 3, the reception side includes a plurality of network-side entities or one UE.

Each physical-layer unit at the reception side is configured to receive the physical-layer transmission block through the wireless link corresponding thereto in the plurality of wireless links through which data is to be transmitted between the reception side and the transmission side, and the physical-layer transmission blocks transmitted through the plurality of wireless links include identical data packets.

In case that the physical-layer unit is the primary physical-layer unit, this physical-layer unit may receive physical-layer transmission blocks reported by physical-layer units corresponding to other wireless links in the plurality of wireless links through which data is to be transmitted between the reception side and the transmission side, and combine and decode a physical-layer transmission block received by this physical-layer unit and the physical-layer transmission blocks reported by other physical-layer units.

In case that the physical-layer unit is not the primary physical-layer unit, this physical-layer unit may report the received physical-layer transmission block to the primary physical-layer unit. In case that the reception side is the network side, this physical-layer unit may report the received physical-layer transmission block to the primary physical-layer unit through an interface therebetween; and in case that the reception side is the UE, the physical-layer unit may report the received physical-layer transmission block to the primary physical-layer unit through an internal interface.

In case that the physical-layer unit is the primary physical-layer unit, the physical-layer unit may transmit feedback information through the wireless link corresponding thereto, and/or notify other physical-layer units to transmit feedback information through wireless links corresponding to the other physical-layer units in accordance with the result of the combining and decoding.

In case that the reception side is the UE, determining, by the reception side, the plurality of wireless links through which data is to be transmitted between the reception side and the transmission side includes determining, by the UE, the plurality of wireless links through which data is to be transmitted between the UE and the network side in accordance with a scheduling command from the network side.

In practice, in case that the reception side is the network side, the reception side may perform configurations of parameters of multiple transmission channels for the UE through high-layer signaling (usually RRC signaling). The configurations may include, but not limited to, one or more of: wireless links which engage in the multiple transmission channels, configuration of a primary cell, configuration of feedback resources, and maximum transmission times. The configurations may be performed by the physical-layer units or other units.

Optionally, in case that the reception side is the network side, the primary physical-layer unit may perform the configurations of parameters of multiple transmission channels through high-layer signaling (usually RRC signaling). For example, the primary physical-layer unit may transmit a downlink scheduling command to the UE, so as to instruct the UE to receive data through a plurality of wireless links. In practice, in case of the protocol-stack architecture in FIG. 2, the primary physical-layer unit may notify the physical-layer unit corresponding to the cell serving the UE, and in case of the protocol-stack architecture in FIG. 3, the primary physical-layer unit may notify the physical-layer unit corresponding to the base station serving the UE.

One scheduling command may indicate data transmission on a plurality of wireless links. The scheduling command may indicate that an identical time-frequency resource position is used by the wireless links carrying PRBs (here, a time-frequency resource position refers to PBRs on available resources, rather than a specific sub-carrier frequency), or the scheduling command may indicate the respective time-frequency resource positions for different wireless links, i.e., different time-frequency resource positions are used by the wireless links carrying the PRBs.

In the embodiments of the present disclosure, the network-side entity may be a base station (e.g., a macro base station or a Femto cell), or a relay node (RN) device, or any other network-side entity. The embodiments of the present disclosure will be described hereinafter by several examples.

First Example: Multi-Channel Transmission Under the Same Base Station (Downlink Transmission)

Referring to the protocol-stack architecture in FIG. 2, the following steps are illustrated.

Step 1: a physical-layer unit 1 of the base station may perform physical-layer treatment (e.g., CRC addition, channel encoding, multiplexing, interleaving, or the like) to an MAC PDU from a high-layer protocol stack so as to generate different redundancy versions (RVs) of physical-layer transmission blocks.

Step 2: the physical-layer unit 1 of the base station may send, in accordance with a scheduling transmission rule, the physical-layer transmission blocks to different physical-layer units 2 which belong to different cells.

Step 3: a primary cell of the base station may transmit a scheduling command for the multi-channel transmission to a UE, so that the physical-layer units 2 belonging to different cells may transmit the redundancy versions of the physical-layer transmission blocks to the UE through different wireless links.

Step 4: the UE may receive the scheduling command from the base station, and receive the physical-layer transmission blocks including the identical data packets through different wireless links in accordance with the scheduling command and configuration of the multi-channel transmission.

Step 5: the UE may combine and decode the physical-layer transmission blocks from the different wireless links, and transmit an ACK message in the primary cell in case of correct decoding or transmit a Non-Acknowledgement (NACK) message (acknowledgement for errors) on the primary cell in case of erroneous decoding.

Step 6: the base station may receive the ACK/NACK message from the UE, and determine whether or not retransmission is needed in accordance with the ACK/NACK message, until the ACK message is feedback by the UE or the number of retransmission times has reached a maximum value.

Second Example: Multi-Channel Transmission Under the Same Base Station (Uplink Transmission)

Referring to the protocol-stack architecture 1 in FIG. 2, the method may include the following steps 1-5.

Step 1: the User Equipment (UE) may perform the physical-layer treatment (e.g., CRC addition, channel encoding, multiplexing, interleaving or the like) to an MAC PDU from a high-layer protocol stack, so as to generate different redundancy versions (RVs) of the physical-layer transmission blocks.

Step 2: the UE may transmit the redundancy versions of the physical-layer transmission blocks to the physical-layer units 2 of different cells through the wireless links for the different cells, in accordance with a scheduling command for the multi-channel transmission sent from a primary cell of the base station.

Step 3: the physical-layer units 2 of the different cells may transmit the redundancy versions of the physical-layer transmission blocks to the physical-layer unit 1.

Step 4: the physical-layer unit 1 may combine and decode the physical-layer transmission blocks transmitted through different wireless links, transmit an ACK message to the UE on the primary cell in case of correct decoding or, transmit an NACK message to the UE on the primary cell in case of erroneous decoding and perform retransmission, until the ACK message is received or the number of retransmission times has reached a maximum value.

Step 5: the UE may perform the retransmission as in Step 1, in accordance with a scheduling command for the retransmission.

Third Example: Multi-Channel Transmission Under Different Base Stations (Downlink Transmission)

Referring to the protocol-stack architecture 2 in FIG. 3, the method may include the following steps 1-4.

Step 1: a physical-layer unit of a primary cell may perform physical-layer treatment (e.g., CRC addition, channel encoding, multiplexing, interleaving or the like) to an MAC PDU from a high-layer protocol stack, so as to generate different redundancy versions (RVs) of physical-layer transmission blocks.

Step 2: a base station of the primary cell may send the different redundancy versions (RVs) of physical-layer transmission blocks to different base stations through interfaces between base stations in accordance with a scheduling transmission rule.

Step 3: the base station of the primary cell may transmit a scheduling command for the multi-channel transmission to the UE, so that the different base stations may transmit the redundancy versions of the physical-layer transmission blocks to the UE through different wireless links.

Step 4: the UE may receive the scheduling command from the base station, and receive the physical-layer transmission blocks including identical data packets through the different wireless links in accordance with the scheduling command and configuration of the multi-channel transmission.

Step 5: the UE may combine and decode the physical-layer transmission blocks transmitted through the different wireless links, and transmit an ACK message on the primary cell in case of correct decoding or transmit an NACK message on the primary cell in case of erroneous decoding.

Step 6: the base station may receive the ACK/NACK message from the UE, and determine whether or not retransmission is needed in accordance with the ACK/NACK message until the ACK message is feedback by the UE or the number of retransmission times has reached a maximum value.

Fourth Example: Multi-Channel Transmission Under Different Base Stations (Uplink Transmission)

Referring to the protocol-stack architecture 2 in FIG. 2, the method may include the following steps 1-5.

Step 1: the User Equipment (UE) may perform physical-layer treatment (e.g., CRC addition, channel encoding, multiplexing, interleaving or the like) to an MAC PDU from a high-layer protocol stack, so as to generate different redundancy versions of the physical-layer transmission blocks.

Step 2: the UE may transmit the different redundancy versions of physical-layer transmission blocks to the physical-layer units belonging to different cells through wireless links for the different cells in accordance with a scheduling command for the multi-channel transmission transmitted from a base station of a primary cell.

Step 3: base stations which engage in the multi-channel transmission may transmit the physical-layer transmission blocks received by the base stations to the base station of the primary cell through interfaces between the base stations and the base station of the primary cell.

Step 4: the physical-layer unit for the base station of the primary cell may combine and decode the physical-layer transmission blocks transmitted through different wireless links, transmit an ACK message in case of correct decoding or an NACK message in case of erroneous decoding to the UE in the primary cell and perform a scheduling for retransmission, until the ACK message is received or the number of retransmission times has reached a maximum value.

Step 5: the UE may perform retransmission as in Step 1, in accordance with the scheduling command for the retransmission.

Fifth Example: Configuration and Enablement for the Multi-Channel Transmission

Step 1: the base station of the primary cell may transmit configuration parameters of the multi-channel transmission to the UE through RRC signaling. The parameters may include one or more of the following: wireless links which are involved in the multi-channel transmission, configuration of the primary cell, configuration of feedback resources, and maximum transmission times. In case that the multi-channel transmission and a single-channel transmission coexist, the base station may further configure different rules for the multi-channel transmission and the single-channel transmission, e.g., a different format of the scheduling command for the multi-channel transmission may be used.

Step 2: in case that the multi-channel transmission is needed, the base station may transmit a physical-layer scheduling command of the multi-channel transmission to the UE, so as to enable the multi-channel transmission at the physical-layer.

Based on the same inventive concept, the embodiments of the present disclosure further provide a transmission device and a reception device. Principles by which these devices operate are similar to those of the above-mentioned transmission method and reception method provided above in the present disclosure. The implementations of these devices may be accomplished by referring to the implementations mentioned above, and thus will not be defined repeatedly herein. In the embodiments of the present disclosure, the transmission device corresponds to the transmission side, and the reception device corresponds to the reception side.

Figure 5:
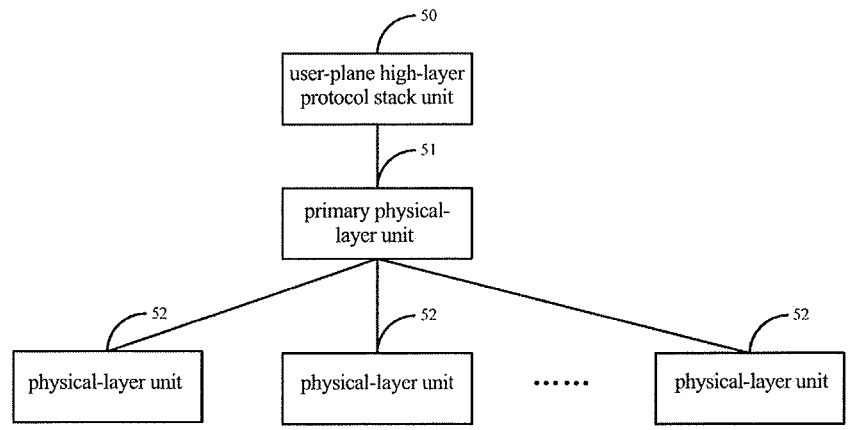
FIG. 5 is a structural schematic diagram of a transmission device according to embodiments of the present disclosure.

As shown in FIG. 5, the embodiments of the present disclosure further provide a transmission device, the transmission device includes a user-plane high-layer protocol stack unit 50, a primary physical-layer unit 51 and a plurality of physical-layer units 52.

The user-plane high-layer protocol stack unit 50 is configured to generate data packets to be transmitted. The primary physical-layer unit 51 is configured to determine a plurality of wireless links through which data is to be transmitted between the transmission device and a reception device; perform physical-layer treatment to the data packets generated by the user-plane high-layer protocol stack unit so as to generate a plurality of physical-layer transmission blocks including identical data packets, and transmit the physical-layer transmission blocks to physical-layer units corresponding to the plurality of wireless links through which data is to be transmitted. The plurality of physical-layer unit 52 are configured to, after having received the physical-layer transmission blocks, transmit the physical-layer transmission blocks to the reception device through wireless links corresponding to the plurality of physical-layer unit 52.

Optionally, redundancy versions of the physical-layer transmission blocks including the identical data packets are completely or partially the same, or completely different from each other.

Optionally, the primary physical-layer unit 51 is further configured to, in case that retransmission is needed, determine whether or not there is a wireless link for which the number of retransmission times has reached a maximum value corresponding to the wireless link, and in case that there is the wireless link for which the number of retransmission times has reached the maximum value, transmit all of the physical-layer transmission blocks to ones of the physical-layer units corresponding to the plurality of wireless links through which data is to be transmitted other than one of the physical-layer units corresponding to the wireless link for which the number of retransmission times has reached the maximum value. One physical-layer transmission block is transmitted to one physical-layer unit.

Optionally, in case that the transmission device is a network-side device, the reception device is the UE, and in case that the transmission device is the UE, the reception device is the network-side device.

Optionally, in case that the transmission device is the network-side device, the primary physical-layer unit 51 is further configured to, before transmitting the physical-layer transmission blocks including the identical data packets to the reception device through the determined plurality of wireless links, transmit a downlink scheduling command to the UE, so as to instruct the UE to receive data through the plurality of wireless links.

Optionally, the transmission device 51 is the UE, and the primary physical-layer unit 51 is further configured to determine the plurality of wireless links through which data is to be transmitted between the UE and the network-side device, in accordance with a scheduling command from the network-side device.

Figure 6:
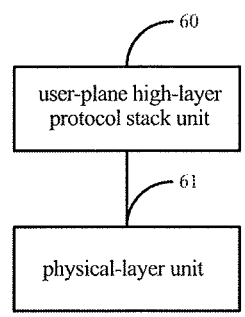
FIG. 6 is a structural schematic diagram of a transmission device according to embodiments of the present disclosure.

As shown in FIG. 6, the embodiments of the present disclosure further provide a transmission device, and the transmission device includes a user-plane high-layer protocol stack unit 60 and a physical-layer unit 61.

The user-plane high-layer protocol stack unit 60 is configured to generate data packets to be transmitted. The physical-layer unit 61 is configured to: in case of being determined as a primary physical-layer unit, determine a plurality of wireless links through which data is to be transmitted between the transmission device and the reception device; perform physical-layer treatment to data packets generated by the user-plane high-layer protocol stack unit to so as to generate a plurality of physical-layer transmission blocks including the identical data packets; transmit all of the plurality of physical-layer transmission blocks to physical-layer units corresponding to the plurality of wireless links through which data is to be transmitted, and transmit one physical-layer transmission block including the identical data packets through a wireless link connected to the primary physical-layer unit; and in case of not being determined as the primary physical-layer unit, transmit one physical-layer transmission block received from the primary physical-layer unit through the wireless link connected to the physical-layer unit.

Optionally, redundancy versions of the physical-layer transmission blocks including the identical data packets are completely or partially the same, or completely different from each other.

Optionally, the physical-layer unit 61 is further configured to, in case of being determined as the primary physical-layer unit and in case that retransmission is needed, determine whether or not there is a wireless link for which the number of retransmission times reaches a maximum value corresponding to the wireless link; and in case that there is the wireless link for which the number of retransmission times has reached the maximum value, transmit all of the physical-layer transmission blocks to the physical-layer units corresponding to the plurality of wireless links through which data is to be transmitted other than the physical-layer unit corresponding to the wireless link for which the number of retransmission times has reached the maximum value. One physical-layer transmission block is transmitted to one physical-layer unit.

Optionally, the physical-layer unit 61 is further configured to, in case of being determined as the primary physical-layer unit and in case that retransmission is needed, determine whether or not the number of its own retransmission times has reached a maximum value corresponding to the primary physical-layer unit; and in case that the number of retransmission times has reached the maximum value, stop its own retransmission, otherwise, continue to transmit one physical-layer transmission block including the identical data packets through the wireless link connected to the physical-layer unit.

Optionally, in case that the transmission device is the network-side device, the reception device is a UE; and in case that the transmission device is the UE, the reception device is the network-side device.

Optionally, the transmission device is the network-side device, and the physical-layer unit 61 is further configured to, after being determined as the primary physical-layer unit and before transmitting the physical-layer transmission blocks including the identical data packets to the reception device through the determined plurality of wireless links, transmit a downlink scheduling command to the UE, so as to instruct the UE to receive data through the plurality of wireless links.

Optionally, the transmission device is the UE, and the physical-layer unit 61 is further configured to, after being determined as the primary physical-layer unit, determine the plurality of wireless links through which data is to be transmitted between the UE and the network-side device in accordance with a scheduling command from the network-side device.

Figure 7:
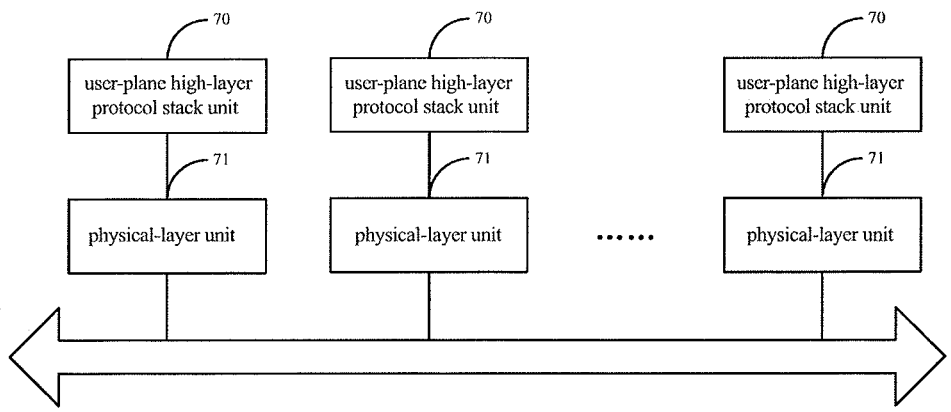
FIG. 7 is a structural schematic diagram of a transmission device according to embodiments of the present disclosure.

As shown in FIG. 7, the embodiments of the present disclosure further provide a transmission device, and the transmission device includes a plurality of user-plane high-layer protocol stack units 70 and a plurality of physical-layer units 71. Each of the user-plane high-layer protocol stack units is connected to a corresponding one of the physical-layer units, and the user-plane high-layer protocol stack units are arranged in one-to-one correspondence with the physical-layer units.

Each of the user-plane high-layer protocol stack unit 70 is configured to generate data packets to be transmitted. Each of the physical-layer units 71 is configured to: after being determined as the primary physical-layer unit, determine a plurality of wireless links through which data is to be transmitted between the transmission device and the reception device; perform physical-layer treatment to the data packets generated by the user-plane high-layer protocol stack unit corresponding to the physical-layer unit, so as to generate a plurality of physical-layer transmission blocks including identical data packets, transmit the physical-layer transmission blocks to the physical-layer units corresponding to the wireless links through which data is to be transmitted, and transmit one physical-layer transmission block including the identical data packets through the wireless link connected to the physical-layer unit.

Optionally, redundancy versions of the physical-layer transmission blocks including the identical data packets are completely or partially the same, or completely different from each other.

Optionally, each physical-layer unit 71 is further configured to, in case of being determined as the primary physical-layer unit and in case that retransmission is needed, determine whether or not there is a wireless link for which the number of retransmission times reaches a maximum value corresponding to the wireless link; and in case that there is the wireless link for which the number of retransmission times has reached the maximum value, transmit all of the physical-layer transmission blocks to the physical-layer units corresponding to the plurality of wireless links through which data is to be transmitted, other than the physical-layer unit corresponding to the wireless link for which the number of retransmission times has reached the maximum value. One physical-layer transmission block is transmitted to one physical-layer unit.

Optionally, each physical-layer unit 71 is further configured to, in case of being determined as the primary physical-layer unit and in case that retransmission is needed, determine whether or not the number of its own retransmission times reaches a maximum value corresponding to the primary physical-layer unit, and in case that the number of its own retransmission times has reached the maximum value, stop its own retransmission, otherwise, continue to transmit one physical-layer transmission block including the identical data packets through the wireless link connected to the physical-layer unit.

Optionally, in case that the transmission device is the network-side device, the reception device is a UE, and in case that the transmission device is a UE, the reception device is the network-side device.

Optionally, the transmission device is the network-side device, and each physical-layer unit 71 is further configured to, after being determined as the primary physical-layer unit and before transmitting the physical-layer transmission blocks including identical data packets to the UE through the determined plurality of wireless links, transmit a downlink scheduling command to the UE, so as to instruct the UE to receive data through the plurality of wireless links.

Optionally, the transmission device is the UE, and each physical-layer unit 71 is further configured to, after being determined as the primary physical-layer unit, determine the plurality of wireless links through which data is to be transmitted between the UE and the network-side device in accordance with a scheduling command from the network-side device.

Figure 8:
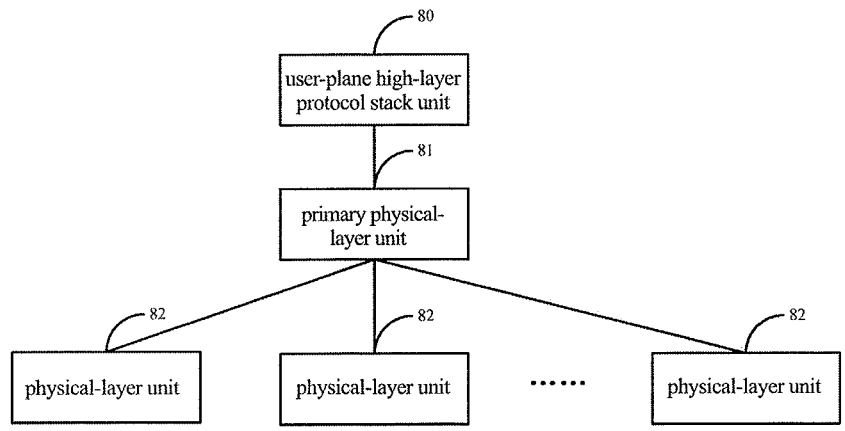
FIG. 8 is a structural schematic diagram of a reception device according to embodiments of the present disclosure.

As shown in FIG. 8, the embodiments of the present disclosure further provide a reception device, and the reception device includes a user-plane high-layer protocol stack unit 80, a primary physical-layer unit 81, and a plurality of physical-layer units 82.

Each of the plurality of physical-layer units 82 is configured to receive a physical-layer transmission block through a wireless link corresponding to the physical-layer unit 82 in a plurality of wireless links through which data is to be transmitted between the reception device and the transmission device, and report the received physical-layer transmission block to the primary physical-layer unit. Physical-layer transmission blocks transmitted through the plurality of wireless links include identical data packets. The primary physical-layer unit 81 is configured to: receive the physical-layer transmission blocks reported by the plurality of physical-layer units corresponding to the plurality of wireless links, other than a wireless link corresponding to the primary physical-layer unit 81 in the plurality of wireless links through which data is to be transmitted between the reception device and the transmission device; combine and decode the physical-layer transmission block received by the primary physical-layer unit and the physical-layer transmission blocks reported by other physical-layer units; and after the physical-layer transmission blocks have been decoded successfully, report data packets to the user-plane high-layer protocol stack unit. The user-plane high-layer protocol stack unit 80 is configured to receive the data packets from the primary physical-layer unit 81.

Optionally, the primary physical-layer unit 81 is further configured to notify at least one of the other physical-layer units to transmit feedback information through a wireless link corresponding to the at least one physical-layer unit, in accordance with a result of the combining and decoding.

Optionally, in case that the transmission device is a network-side device, the reception device is a UE, and in case that the transmission device is a UE, the reception device is a network-side device.

Optionally, the reception device is the UE, and the primary physical-layer unit 81 is further configured to determine the plurality of wireless links through which data is to be transmitted between the UE and the network-side device in accordance with a scheduling command from the network-side device.

Optionally, the reception device is the network-side device, and the primary physical-layer unit 81 is further configured to determine the plurality of wireless links through which data is to be transmitted between the network-side device and the UE, and transmit an uplink scheduling command to the UE, so as to instruct the UE to transmit data through the plurality of wireless links.

In practice, the physical-layer units 52 in FIG. 5 and the physical-layer units 82 in FIG. 8 may be combined into a plurality of physical-layer units, and an uplink transmission function or a downlink transmission function may be selected in accordance with practical needs. For example, in case of N physical-layer units 52 in FIG. 5 and N physical-layer units 82 in FIG. 8, they may be combined into N physical-layer units.

In addition, the primary physical-layer unit 51 in FIG. 5 and the primary physical-layer unit 81 in FIG. 8 may be combined into one primary physical-layer unit, and an uplink transmission function or a downlink transmission function may be selected in accordance with practical needs.

Furthermore, the user-plane high-layer protocol stack unit 50 in FIG. 5 and the user-plane high-layer protocol stack unit 80 in FIG. 8 may be combined into one user-plane high-layer protocol stack unit, and an uplink transmission function or a downlink transmission function may be selected in accordance with practical needs.

Figure 9:
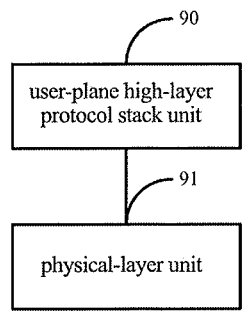
FIG. 9 is a structural schematic diagram of a reception device according to embodiments of the present disclosure.

As shown in FIG. 9, the embodiments of the present disclosure further provide a reception device, and the reception device includes a user-plane high-layer protocol stack unit 90 and a physical-layer unit 91. The physical-layer unit 91 is configured to: receive a physical-layer transmission block through a wireless link corresponding to the physical-layer unit in a plurality of wireless links through which data is to be transmitted between the reception device and a transmission device, wherein the physical-layer transmission blocks transmitted through the plurality of wireless links include identical data packets; and in case that the physical-layer unit is a primary physical-layer unit, receive the physical-layer transmission blocks reported by other physical-layer units corresponding to other wireless links in the plurality of wireless links through which data is to be transmitted between the reception device and the transmission device; combine and decode the physical-layer transmission block received by the physical-layer unit and the physical-layer transmission blocks reported by the other physical-layer units; and after the physical-layer transmission blocks have been decoded successfully, report resultant data packets to the user-plane high-layer protocol stack unit; and in case that the physical-layer unit is not the primary physical-layer unit, report the received physical-layer transmission block to the primary physical-layer unit. The user-plane high-layer protocol stack unit 90 is configured to receive the data packets from the physical-layer unit 91.

Optionally, in case that the physical-layer unit 91 is the primary physical-layer unit, the physical-layer unit 91 is further configured to, in accordance with a result of the combining and decoding, transmit feedback information through the wireless link corresponding to the primary physical-layer unit, and/or notify other physical-layer units to transmit feedback information through the wireless links corresponding to the other physical-layer units.

Optionally, in case that the transmission device is a network-side device, the reception device is a UE, and in case that the transmission device is a UE, the reception device is a network-side device.

Optionally, the reception device is the UE, and the physical-layer unit 91 is further configured to determine the plurality of wireless links through which data is to be transmitted between the UE and the network-side device in accordance with a scheduling command from the network-side device.

Optionally, the reception device is the network-side device, and the physical-layer unit 91 is further configured to determine the plurality of wireless links through which data is to be transmitted between the network-side device and the UE, and transmit an uplink scheduling command to the UE, so as to instruct the UE to transmit data through the plurality of wireless links.

In practice, the physical-layer unit 61 in FIG. 6 and the physical-layer unit 91 in FIG. 9 may be combined into one physical-layer unit, and an uplink transmission function or a downlink transmission function may be selected in accordance with practical needs.

In addition, the user-plane high-layer protocol stack unit 60 in FIG. 6 and the user-plane high-layer protocol stack unit 90 in FIG. 9 may be combined into one user-plane high-layer protocol stack unit, and an uplink transmission function or a downlink transmission function may be selected in accordance with practical needs.

Figure 10:
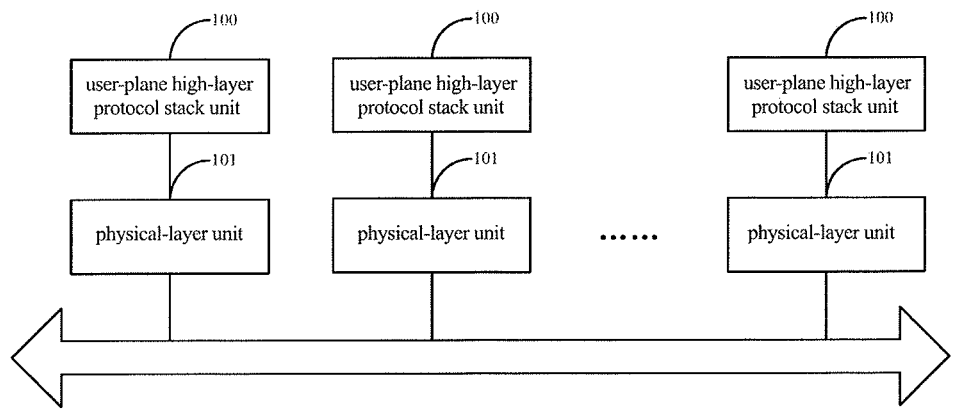
FIG. 10 is a structural schematic diagram of a reception device according to embodiments of the present disclosure.

As shown in FIG. 10, the embodiments of the present disclosure further provide a reception device, and the reception device includes a plurality of user-plane high-layer protocol stack units 100 and a plurality of physical-layer units 101. Each of the user-plane high-layer protocol stack units 100 is connected to a corresponding one of the physical-layer units 101, and the user-plane high-layer protocol stack units are arranged in one-to-one correspondence with the physical-layer units.

Each physical-layer unit 101 is configured to: receive a physical-layer transmission block through a wireless link corresponding to the physical-layer unit in a plurality of wireless links through which data is to be transmitted between the reception device and a transmission device, wherein physical-layer transmission blocks transmitted through the wireless links include identical data packets; in case that the physical-layer unit is a primary physical-layer unit, receive physical-layer transmission blocks reported by other physical-layer units corresponding to other wireless links in the plurality of wireless links through which data is to be transmitted between the reception device and the transmission device; combine and decode a physical-layer transmission block received by the primary physical-layer unit and the physical-layer transmission blocks reported by the other physical-layer units; and after the physical-layer transmission blocks have been decoded successfully, report resultant data packets to one of the user-plane high-layer protocol stack units corresponding to the primary physical-layer unit; and in case that the physical-layer unit is not the primary physical-layer unit, report the received physical-layer transmission block to the primary physical-layer unit.

Each of the user-plane high-layer protocol stack units 100 is configured to receive the data packets from one of the physical-layer units corresponding to the user-plane high-layer protocol stack unit.

Optionally, in case that the physical-layer unit is the primary physical-layer unit, the physical-layer unit is further configured to, in accordance with a result of the combining and decoding, transmit feedback information through the wireless link corresponding to the primary physical-layer unit, and/or notify other physical-layer units to transmit feedback information through the wireless links corresponding to the other physical-layer units.

Optionally, in case that the transmission device is a network-side device, the reception device is a UE, and in case that the transmission device is a UE, the reception device is a network-side device.

Optionally, the reception device is the UE, and each physical-layer unit 101 is further configured to determine the plurality of wireless links through which data is to be transmitted between the UE and the network-side device in accordance with a scheduling command from the network-side device.

Optionally, the reception device is the network-side device, and each physical-layer unit 101 is further configured to determine the plurality of wireless links through which data is to be transmitted between the network-side device and the UE, and transmit an uplink scheduling command to the UE, so as to instruct the UE to transmit data through the plurality of wireless links.

In practice, the physical-layer units 71 in FIG. 7 and the physical-layer units 101 in FIG. 10 may be combined into a plurality of physical-layer units, and an uplink transmission function or a downlink transmission function may be selected in accordance with practical needs. For example, in case of N physical-layer units 71 in FIG. 7 and N physical-layer units 101 in FIG. 10, they may be combined into N physical-layer units.

In addition, the user-plane high-layer protocol stack units 70 in FIG. 7 and the user-plane high-layer protocol stack units 100 in FIG. 10 may be combined into a plurality of user-plane high-layer protocol stack units, and an uplink transmission function or a downlink transmission function may be selected in accordance with practical needs. For example, in case of N user-plane high-layer protocol stack units 70 in FIG. 7 and N user-plane high-layer protocol stack units 100 in FIG. 10, they may be combined into N user-plane high-layer protocol stack units.

Figure 11:
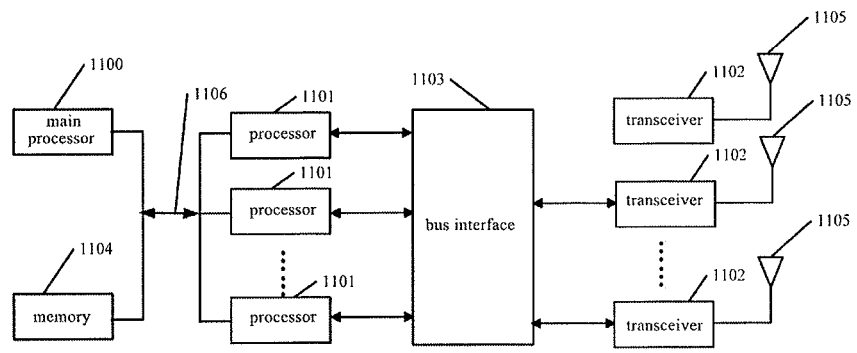
FIG. 11 is a structural schematic diagram of a transmission device according to embodiments of the present disclosure.

As shown in FIG. 11, the embodiments of the present disclosure further provide a transmission device, and the transmission device includes a main processor 1100, a plurality of processors 1101 and a plurality of transceivers 1102. The main processor 1100 is configured to read programs stored in a memory 1104, so as to: generate data packets to be transmitted; determine a plurality of wireless links through which data is to be transmitted between the transmission device and a reception device; perform physical-layer treatment to the generated data packets to generate a plurality of physical-layer transmission blocks including identical data packets; and transmit the physical-layer transmission blocks to the processors corresponding to the plurality of wireless links through which data is to be transmitted. Each of the processors 1101 is configured to read programs stored in a memory 1004, so as to, upon receipt of a physical-layer transmission block corresponding to the processor, transmit the physical-layer transmission block to the reception device through the wireless link corresponding to the processor 1101. Each of the transceivers 1102 is configured to receive and transmit data under control of the processor 1101 corresponding to the transceiver 1102.

Optionally, redundancy versions of the physical-layer transmission blocks including the identical data packets are completely or partially the same, or completely different from each other.

Optionally, the main processor 1100 is further configured to, in case that retransmission is needed, determine whether or not there is a wireless link for which the number of retransmission times reaches a maximum value corresponding to the wireless link, and in case that there is the wireless link for which the number of retransmission times has reached the maximum value, transmit all of the physical-layer transmission blocks to processors corresponding to the plurality of wireless links through which data is to be transmitted, other than the processor corresponding to the wireless link for which the number of retransmission times has reached the maximum value. One physical-layer transmission block is transmitted to one processor.

Optionally, in case that the transmission device is a network-side device, the reception device is a UE, and in case that the transmission device is a UE, the reception device is a network-side device.

Optionally, in case that the transmission device is the network-side device, the main processor 1100 is further configured to, before transmitting the physical-layer transmission blocks including the identical data packets to the reception device through the determined plurality of wireless links, transmit a downlink scheduling command to a UE, so as to instruct the UE to receive data through the plurality of wireless links.

Optionally, the transmission device is the UE, and the primary processor 1100 is further configured to, determine the plurality of wireless links through which data is to be transmitted between the UE and a network-side device in accordance with a scheduling command from the network-side device.

In FIG. 11, a bus architecture represented by a bus 1106 may include a number of buses and bridges connected to each other, so as to connect various circuits such as one or more processors represented by the processors 1101 and a memory represented by a memory 1104. In addition, as is known in the art, the bus 1106 may be used to connect any other circuits, such as a peripheral device, a voltage stabilizer and a power management circuit. Thus, detailed description of the bus 1106 is not provided herein. A bus interface 1103 is provided between the bus 1106 and the transceivers 1102, and the transceivers 1102 may include one or more elements, i.e., a plurality of transmitters and a plurality of receivers, for communication with other devices over a transmission medium. Data processed by the processors 1101 is transmitted over a wireless medium through antennas 1105. Further, the antennas 1105 are further configured to receive data and transmit the data to the processors 1101.

The processors 1101 may take charge of managing the bus 1106 as well as general transactions, and may further provide various functions such as timing, peripheral interfacing, voltage regulation, power source management and any other control functions. The memory 1104 may store therein data used during operation of the processors 1101.

Optionally, each of the processor 1101 may be a Central Processing Unit (CPU), an Application Specific Integrated Circuit (ASIC), a Field-Programmable Gate Array (FPGA) or a Complex Programmable Logic Device (CPLD).

Figure 12:
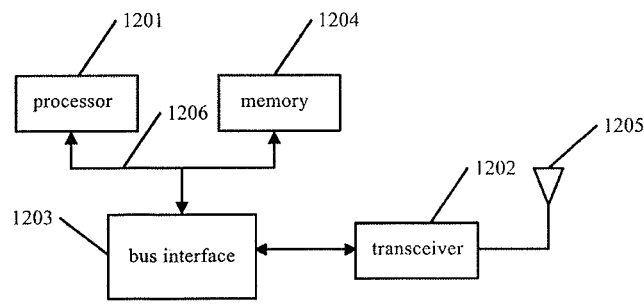
FIG. 12 is a structural schematic diagram of a transmission device according to embodiments of the present disclosure.

As shown in FIG. 12, the embodiments of the present disclosure further provide a transmission device, and the transmission device includes a processor 1201, a transceiver 1202 and a memory 1204. The processor 1201 is configured to read programs stored in the memory 1204, so as to: generate data packets to be transmitted; in case of being determined as a main processor, determine a plurality of wireless links through which data is to be transmitted between the transmission device and a reception device; perform physical-layer treatment to the generated data packets so as to generate a plurality of physical-layer transmission blocks including identical data packets; transmit all of the physical-layer transmission blocks to processors corresponding to the plurality of wireless links through which data is to be transmitted, and transmit one physical-layer transmission block including the identical data packets through a wireless link connected to the processor; and in case of not being determined as the main processor, transmit a physical-layer transmission block received from the main processor through the wireless link connected to the processor. The transceiver 1202 is configured to receive and transmit data under control of the processor 1201.

Optionally, redundancy versions of the physical-layer transmission blocks including the identical data packets are completely or partially the same, or completely different from each other.

Optionally, the processor 1201 is further configured to, in case that retransmission is needed, determine whether or not there is a wireless link for which the number of retransmission times reaches a maximum value corresponding to the wireless link; and in case that there is the wireless link for which the number of retransmission times has reached the maximum value corresponding to the wireless link, transmit all of the physical-layer transmission blocks to the processors corresponding to the plurality of wireless links through which data is to be transmitted, other than the processor corresponding to the wireless link for which the number of retransmission times has reached the maximum value corresponding to the wireless link. One physical-layer transmission block is transmitted to one processor.

Optionally, the processor 1201 is further configured to, in case that retransmission is needed, determine whether or not the number of its own retransmission times reaches a maximum value corresponding to the processor 1201, and in case that the number of its own retransmission times has reached the maximum value corresponding to the processor 1201, stop the retransmission, otherwise, continue to transmit one physical-layer transmission block including the identical data packets through the wireless link connected to the processor 1201.

Optionally, in case that the transmission device is a network-side device, the reception device is a UE; and in case that the transmission device is a UE, the reception device is a network-side device.

Optionally, the transmission device is the network-side device, and the processor 1201 is further configured to, before transmitting the physical-layer transmission blocks including the identical data packets to the UE through the determined plurality of wireless links, transmit a downlink scheduling command to the UE, so as to instruct the UE to receive data through the plurality of wireless links.

Optionally, the transmission device is the UE, and the processor 1201 is further configured to determine the plurality of wireless links through which data is to be transmitted between the UE and the network-side device in accordance with a scheduling command from the network-side device.

In FIG. 12, a bus architecture represented by a bus 1206 may include a number of buses and bridges connected to each other, so as to connect various circuits including one or more processors such as the processor 1201 and a memory such as a memory 1204. In addition, as is known in the art, the bus 1206 may be used to connect any other circuits, such as a peripheral device, a voltage stabilizer and a power management circuit. A bus interface 1203 is provided between the bus 1206 and the transceiver 1202, and the transceiver 1202 may include one or more elements, i.e., a plurality of transmitters and a plurality of receivers, for communication with any other devices over a transmission medium. Data processed by the processor 1201 is transmitted over a wireless medium through an antenna 1205. Further, the antenna 1205 is further configured to receive data and transmit the data to the processor 1201.

The processor 1201 may take charge of managing the bus 1206 as well as general transactions, and may further provide various functions such as timing, peripheral interfacing, voltage regulation, power source management and any other control functions. The memory 1204 may store therein data used during operation of the processor 1201.

Optionally, the processor 1201 may be a CPU, an ASIC, an FPGA or a CPLD.

Figure 13:
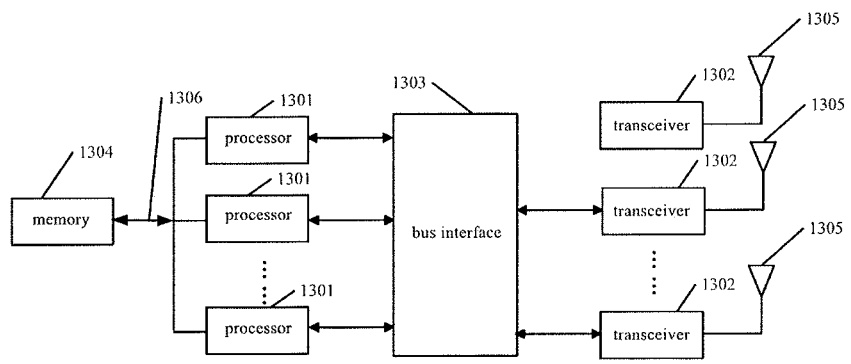
FIG. 13 is a structural schematic diagram of a transmission device according to embodiments of the present disclosure.

As shown in FIG. 13, the embodiments of the present disclosure further provide a transmission device, and the transmission device includes a plurality of processors 1301 and a plurality of transceivers 1302. Each of the plurality of processor 1301 is connected to a corresponding one of the transceivers 1302, and the processors 1301 are arranged in one-to-one correspondence with the transceivers 1302.

Each processor 1301 is configured to read programs stored in a memory 1304, so as to: generate data packets to be transmitted; after being determined as a main processor, determine a plurality of wireless links through which data is to be transmitted between the transmission device and a reception device; perform physical-layer treatment to the generated data packets so as to generate a plurality of physical-layer transmission blocks including identical data packets; transmit all of the physical-layer transmission blocks to processors corresponding to the wireless links through which data is to be transmitted, and transmit one physical-layer transmission block including the identical data packets through the wireless link connected to the main processor; and after not being determined as the main processor, transmit the physical-layer transmission block received from the main processor through the wireless link connected to the processor. The transceiver 1302 is configured to receive and transmit data under control of the processor 1301.

Optionally, redundancy versions of the physical-layer transmission blocks including the identical data packets are completely or partially the same, or completely different from each other.

Optionally, each processor 1301 is further configured to, in case that retransmission is needed, determine whether or not there is a wireless link for which the number of retransmission times reaches a maximum value corresponding to the wireless link; and in case that there is the wireless link for which the number of retransmission times has reached the maximum value, transmit all of the physical-layer transmission blocks to processors corresponding to the plurality of wireless links through which data is to be transmitted, other than the processor corresponding to the wireless link for which the number of retransmission times has reached the maximum value. One physical-layer transmission block is transmitted to one processor.

Optionally, each processor 1301 is further configured to, in case that retransmission is needed, determine whether or not the number of its own retransmission times reaches a maximum value corresponding to the processor 1301, and in case that the number of its own retransmission times has reached the maximum value, stop the retransmission, otherwise, continue to transmit one physical-layer transmission block including the identical data packets through the wireless link connected to the processor 1301.

Optionally, in case that the transmission device is a network-side device, the reception device is a UE; and in case that the transmission device is a UE, the reception device is a network-side device.

Optionally, the transmission device is the network-side device, and each processor 1301 is further configured to, before transmitting the physical-layer transmission blocks including the identical data packets to the UE through the determined plurality of wireless links, transmit a downlink scheduling command to the UE, so as to instruct the UE to receive data through the plurality of wireless links.

Optionally, the transmission device is the UE, and each processor 1301 is further configured to determine the plurality of wireless links through which data is to be transmitted between the UE and the network-side device in accordance with a scheduling command from the network-side device.

In FIG. 13, a bus architecture represented by a bus 1306 may include a number of buses and bridges connected to each other, so as to connect various circuits including one or more processors such as processors 1301 and a memory such as a memory 1304. In addition, as is known in the art, the bus 1306 may be used to connect any other circuits, such as a peripheral device, a voltage stabilizer and a power management circuit. Thus, detailed description of the bus 1306 is not provided herein. A bus interface 1303 is provided between the bus 1306 and the transceiver 1302, and the transceiver 1302 may include one or more elements, i.e., a plurality of transmitters and a plurality of receivers, for communication with any other devices over a transmission medium. Data processed by the processors 1301 is transmitted over a wireless medium through antennas 1305. Further, the antennas 1305 are further configured to receive data and transmit the data to the processors 1301.

The processors 1301 may take charge of managing the bus 1306 as well as general transactions, and may further provide various functions such as timing, peripheral interfacing, voltage regulation, power source management and any other control functions. The memory 1304 may store therein data used during operation of the processors 1301.

Optionally, the processor 1301 may be a CPU, an ASIC, an FPGA or a CPLD.

Figure 14:
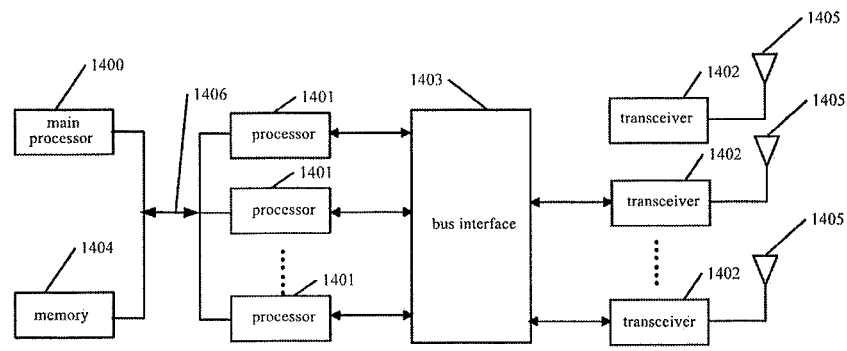
FIG. 14 is a structural schematic diagram of a reception device according to embodiments of the present disclosure.

As shown in FIG. 14, the embodiments of the present disclosure further provide a reception device, and the reception device includes a main processor 1400, a plurality of processors 1401, and a plurality of transceivers 1402.

The main processor 1400 is configured to read programs stored in a memory 1404, so as to: receive physical-layer transmission blocks reported by processors corresponding to other wireless links in a plurality of wireless links through which data is to be transmitted between the reception device and a transmission device; combine and decode the physical-layer transmission block received by the main processor and the physical-layer transmission blocks reported by the processors; and after the decoding is performed successfully, report resultant data packets to the user-plane high-layer protocol stack unit.

Each of the processors 1401 is configured to read programs stored in the memory 1404, so as to: receive a physical-layer transmission block through a wireless link corresponding to the processor 1401 in the plurality of wireless links through which data is to be transmitted between the reception device and the transmission device; and report the received physical-layer transmission block to the main processor. The physical-layer transmission blocks transmitted through the wireless links include identical data packets. Each of the transceiver 1402 is configured to receive and transmit data under control of a corresponding one of the processors 1402.

Optionally, the main processor 1400 is further configured to notify at least one of the processors to transmit feedback information through a corresponding one of the wireless links in accordance with a result of the combining and decoding.

Optionally, in case that the transmission device is a network-side device, the reception device is a UE; and in case that the transmission device is a UE, the reception device is a network-side device.

Optionally, the reception device is the UE, and the main processor 1400 is further configured to determine the plurality of wireless links through which data is to be transmitted between the UE and the network-side device in accordance with a scheduling command from the network-side device.

Optionally, the reception device is a network-side device, and the main processor 1400 is further configured to determine the plurality of wireless links through which data is to be transmitted between the network-side device and the UE, and transmit an uplink scheduling command to the UE, so as to instruct the UE to transmit data through the plurality of wireless links.

In FIG. 14, a bus architecture represented by a bus 1406 may include a number of buses and bridges connected to each other, so as to connect various circuits including one or more processors such as processors 1401 and a memory such as the memory 1404. In addition, as is known in the art, the bus 1406 may be used to connect any other circuits, such as a peripheral device, a voltage stabilizer and a power management circuit. Thus, detailed description of the bus will not be provided herein. A Bus interface 1403 is provided between the bus 1406 and the transceiver 1402. The transceivers 1402 may include one or more elements, i.e., a plurality of transmitters and a plurality of receivers, for communication with any other devices over a transmission medium. Data processed by the processors 1401 is transmitted over a wireless medium through antennas 1405. Further, the antennas 1405 are further configured to receive data and transmit the data to the processors 1401.

The processor 1401 may take charge of managing the bus 1406 as well as general transactions, and may further provide various functions such as timing, peripheral interfacing, voltage regulation, power source management and any other control functions. The memory 1404 may store therein data used during operation of the processor 1401.

Optionally, the processor 1401 may be a CPU, an ASIC, an FPGA or a CPLD.

In practice, the main processor 1100 in FIG. 11 and the main processor 1400 in FIG. 14 may be combined into one main processor, and an uplink transmission function or a downlink transmission function may be selected in accordance with practical needs.

The processors 1101 in FIG. 11 and the processors 1401 in FIG. 14 may be combined into a plurality of processor, and an uplink transmission function or a downlink transmission function may be selected in accordance with practical needs. For example, in case of N processors 1101 in FIG. 11 and N processors 1401 in FIG. 14, the N processors 1101 and the N processors 1401 may be combined into N processors.

Further, the transceivers 1102 in FIG. 11 and the transceivers 1402 in FIG. 14 may be combined into a plurality of transceivers, and an uplink transmission function or a downlink transmission function may be selected in accordance with practical needs. For example, in case of N transceivers 1102 in FIG. 11 and N transceivers 1402 in FIG. 14, the N transceivers 1102 and the N transceivers 1402 may be combined into N transceivers.

Figure 15:
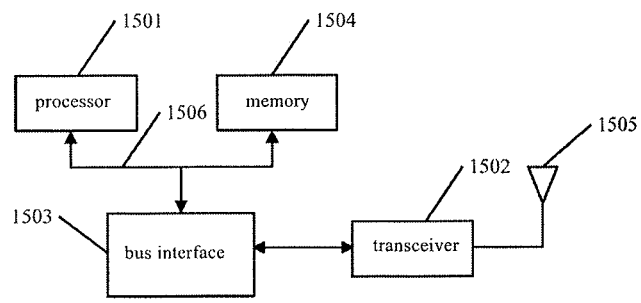
FIG. 15 is a structural schematic diagram of a reception device according to embodiments of the present disclosure.

As shown in FIG. 15, the embodiments of the present disclosure further provide a reception device, and the reception device includes a processor 1501 and a transceiver 1502.

The processor 1501 is configured to read programs stored in a memory 1504, so as to: receive a physical-layer transmission block through a wireless link corresponding to the processor 1501 in a plurality of wireless links through which data is to be transmitted between the reception device and a transmission device, the physical-layer transmission blocks transmitted through the wireless links including identical data packets; in case that the processor is a main processor, receive the physical-layer transmission blocks reported by other processors corresponding to the other wireless links in the plurality of wireless links through which data is to be transmitted between the reception device and the transmission device, and combine and decode the physical-layer transmission block received by the processor 1501 and the physical-layer transmission blocks reported by other processors; and after the decoding has been performed successfully, report resultant data packets to the user-plane high-layer protocol stack unit; and in case that the processor is not the main processor, report the received physical-layer transmission block to the main processor. The transceiver 1502 is configured to receive and transmit data under control of the processor 1501.

Optionally, in case that the processor 1501 is the main processor, the processor 1501 is further configured to, in accordance with a result of the combining and decoding, transmit feedback information through the wireless link corresponding to the processor 1501, and/or notify other processors to transmit feedback information through the wireless links corresponding to the other processors.

Optionally, in case that the transmission device is a network-side device, the reception device is a UE; and in case that the transmission device is a UE, the reception device is a network-side device.

Optionally, the reception device is the UE, and the processor 1501 is further configured to determine the plurality of wireless links through which data is to be transmitted between the UE and the network-side device in accordance with a scheduling command from the network-side device.

Optionally, the reception device is the network-side device, and the processor 1501 is further configured to determine the plurality of wireless links through which data is to be transmitted between the network-side device and the UE, and transmit an uplink scheduling command to the UE, so as to instruct the UE to transmit data through the plurality of wireless links.

In FIG. 15, a bus architecture represented by a bus 1506 may include a number of buses and bridges connected to each other, so as to connect various circuits including one or more processors such as the processors 1501 and a memory such as the memory 1504. In addition, as is known in the art, the bus 1506 may be used to connect any other circuits, such as a peripheral device, a voltage stabilizer and a power management circuit. Thus, detailed description thereof is not provided herein. A bus interface 1503 is provided between the bus 1506 and the transceiver 1502, and the transceiver 1502 may include one or more elements, i.e., a plurality of transmitters and a plurality of receivers, for communication with any other devices over a transmission medium. Data processed by the processors 1501 is transmitted over a wireless medium through an antenna 1505. Further, the antenna 1505 is further configured to receive data and transmit the data to the processor 1501.

The processor 1501 may take charge of managing the bus 1506 as well as general transactions, and may further provide various functions such as timing, peripheral interfacing, voltage regulation, power source management and any other control functions. The memory 1504 may store therein data used during operation of the processor 1501.

Optionally, the processor 1501 may be a CPU, an ASIC, an FPGA or a CPLD.

In practice, the processor 1201 in FIG. 12 and the processor 1501 in FIG. 15 may be combined into one processor, and an uplink transmission function or a downlink transmission function may be selected in accordance with practical needs.

In addition, the transceiver 1202 in FIG. 12 and the transceiver 1502 in FIG. 15 may be combined into one transceiver, and an uplink transmission function or a downlink transmission function may be selected in accordance with the practical needs.

Figure 16:
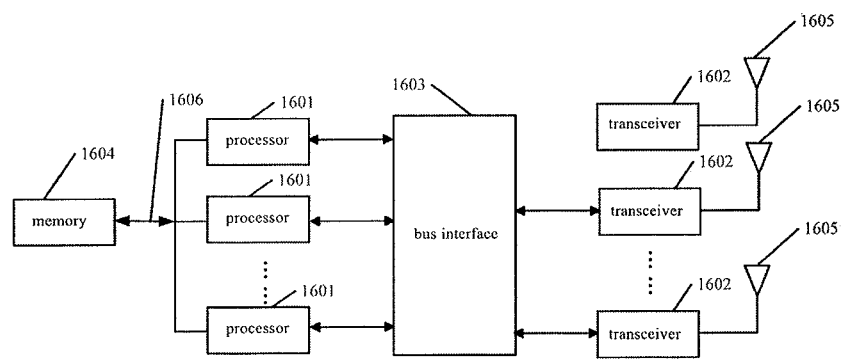
FIG. 16 is a structural schematic diagram of a reception device according to embodiments of the present disclosure.

As shown in FIG. 16, the embodiments of the present disclosure further provides a reception device, and the reception device includes a plurality of processors 1601 and a plurality of transceivers 1602. Each of the plurality of processors 1601 is connected to a corresponding one of the plurality of transceivers 1602, and the processors 1601 are arranged in one-to-one correspondence with the transceivers 1602.

Each of the processors 1601 is configured to read programs stored in a memory 1604, so as to: receive a physical-layer transmission block through a wireless link corresponding to the processor 1601 in a plurality of wireless links through which data is to be transmitted between the reception device and a transmission device, a physical-layer transmission block transmitted through each wireless link including identical data packets; and in case that the processor 1601 is a main processor, receive physical-layer transmission blocks reported by other processors corresponding to the wireless links other than the wireless link corresponding to the processor 1601 in the plurality of wireless links through which data is to be transmitted between the reception device and the transmission device, and combine and decode the physical-layer transmission block received by the processor 1601 and the physical-layer transmission blocks reported by other processors, and after the decoding is performed successfully, report resultant data packets to a corresponding user-plane high-layer protocol stack unit; and in case that the processor is not the main processor, report the received physical-layer transmission block to the main processor. Each transceiver 1602 is configured to receive and transmit data under control of the processor 1601.

Optionally, in case that the processor 1601 is the main processor, the processor 1601 is further configured to, in accordance with a result of the combining and decoding, transmit feedback information through the wireless link corresponding to the processor 1601, and/or notify other processors to transmit feedback information through the wireless links corresponding to other processors.

Optionally, in case that the transmission device is a network-side device, the reception device is a UE, and in case that the transmission device is a UE, the reception device is a network-side device.

Optionally, the reception device is the UE, and each processor 1601 is further configured to determine the plurality of wireless links through which data is to be transmitted between the UE and the network-side device in accordance with a scheduling command from the network-side device.

Optionally, the reception device is the network-side device, and each processor 1601 is further configured to determine the plurality of wireless links through which data is to be transmitted between the network-side device and the UE, and transmit an uplink scheduling command to the UE, so as to instruct the UE to transmit data through the plurality of wireless links.

In FIG. 16, a bus architecture represented by a bus 1606 may include a number of buses and bridges connected to each other, so as to connect various circuits including one or more processors such as the processor 1601 and a memory such as the memory 1604. In addition, as is known in the art, the bus 1606 may be used to connect any other circuits, such as a peripheral device, a voltage stabilizer and a power management circuit. Thus, detailed description thereof is not provided herein. A bus interface 1603 is provided between the bus 1606 and the transceiver 1602, and the transceiver 1602 may consist of one or more elements, i.e., a plurality of transmitters and a plurality of receivers, for communication with any other devices over a transmission medium. Data processed by the processor 1601 is transmitted over a wireless medium through an antenna 1605. Further, the antenna 1605 is further configured to receive data and transmit the data to the processor 1601.

The processor 1601 may take charge of managing the bus 1606 as well as general transactions, and may further provide various functions such as timing, peripheral interfacing, voltage regulation, power source management and any other control functions. The memory 1604 may store therein data used during operation of the processor 1601.

Optionally, the processor 1601 may be a CPU, an ASIC, an FPGA or a CPLD.

In practice, the processors 1301 in FIG. 13 and the processor 1601 in FIG. 16 may be combined into a plurality of processors, and an uplink transmission function or a downlink transmission function may be selected in accordance with practical needs. For example, in case of N processors 1301 in FIG. 13 and N processors 1601 in FIG. 16, they may be combined into N processors.

In addition, the transceivers 1302 in FIG. 13 and the transceivers 1602 in FIG. 16 may be combined into a plurality of transceivers, and an uplink transmission function or a downlink transmission function may be selected in accordance with practical needs. For example, in case of N transceivers 1302 in FIG. 13 and N transceivers 1602 in FIG. 16, they may be combined into N transceivers.

According to the embodiments of the present disclosure, a transmission side may determine a plurality of wireless links through which data is to be transmitted between the transmission side and a reception side, and transmit physical-layer transmission blocks including identical data packets to the reception side through the determined plurality of wireless links. The physical-layer transmission blocks including identical data packets are transmitted through different wireless links, so resources for different wireless links connected to the reception side may be fully used, thereby to improve real-time property and reliability and meet requirements for the real-time property and reliability by new applications such as MTC in a better manner as compared with a conventional wireless communication system.

Obviously, a person skilled in the art may make various modifications and improvements without departing from the spirit and the scope of the present disclosure. The modifications and improvements are also intended to be within the scope of the present disclosure, in case that such modifications and improvements fall within the scope of claims of the present disclosure ant equivalent thereof.

What is claimed is:

1. A method for data transmission, comprising:
   determining, by a transmission device, a plurality of wireless links through which data is to be transmitted between the transmission device and a reception device; and
   transmitting, by the transmission device, physical-layer transmission blocks including identical Medium Access Control (MAC) Protocol Data Units (PDUs) to the reception device through the determined plurality of wireless links,
   wherein, redundancy versions of the physical-layer transmission blocks including the identical MAC PDUs are partially the same, or completely different.

2. The method according to claim 1, wherein determining, by the transmission device, a plurality of wireless links through which data is to be transmitted between the transmission device and the reception device comprises:
   determining, by a primary physical-layer unit in the transmission device, the plurality of wireless links through which data is to be transmitted between the transmission device and the reception device, and
   transmitting, by the transmission device, physical-layer transmission blocks including identical MAC PDUs to the reception device through the determined plurality of wireless links comprises:
   performing, by the primary physical-layer unit, physical-layer treatment to MAC PDUs generated by a user-plane high-layer protocol stack, so as to generate the physical-layer transmission blocks including the identical MAC PDUs;
   transmitting, by the primary physical-layer unit, all of the physical-layer transmission blocks to physical-layer units corresponding to the plurality of wireless links through which data is to be transmitted, one physical-layer transmission block being transmitted to one physical-layer unit; and
   transmitting, by the physical-layer units corresponding to the plurality of wireless links through which data is to be transmitted, the physical-layer transmission blocks including the identical MAC PDUs to the reception device through the wireless links corresponding to the physical-layer units.

3. The method according to claim 2, wherein in case that the primary physical-layer unit is one primary physical-layer unit corresponding to all of the physical-layer units for all of the plurality of wireless links, the physical-layer units corresponding to the plurality of wireless links through which data is to be transmitted do not comprise the primary physical-layer unit, or
   in case that the primary physical-layer unit is one of the physical-layer units corresponding to all of the wireless links, the physical-layer units corresponding to the plurality of wireless links through which data is to be transmitted comprise the primary physical-layer unit.

4. The method according to claim 3, wherein the MAC PDUs acquired by the primary physical-layer unit are generated by a user-plane high-layer protocol stack positioned at a layer above the primary physical-layer unit.

5. The method according to claim 2, wherein after transmitting, by the transmission device, the physical transmission blocks including the identical MAC PDUs to the reception device through the determined plurality of wireless links, the method further comprises:
   in case that retransmission is needed, determining, by the primary physical-layer unit, whether or not there is a wireless link for which the number of retransmission times reaches a maximum value corresponding to the wireless link; and
   in case that there is the wireless link for which the number of retransmission times has reached the maximum value corresponding to the wireless link, transmitting, by the primary physical-layer unit, all of the physical-layer transmission blocks to physical-layer units corresponding to the plurality of wireless links through which data is to be transmitted, other than a physical-layer unit corresponding to the wireless link for which the number of retransmission times has reached the maximum value corresponding to the wireless link,
   wherein one physical-layer transmission block is transmitted to one physical-layer unit.

6. The method according to claim 1, wherein the transmission device is a network-side device and the reception device is a User Equipment (UE), and before transmitting, by the transmission device, the physical-layer transmission blocks including the identical MAC PDUs to the reception device through the determined plurality of wireless links, the method further comprises:
   transmitting, by the network-side device, a downlink scheduling command to the UE, so as to instruct the UE to receive data through the plurality of wireless links; or
   the transmission device is the UE and the reception device is the network-side device, and determining, by the transmission device, a plurality of wireless links through which data is to be transmitted between the transmission device and the reception device comprises: determining, by the UE, the plurality of wireless links through which data is to be transmitted between the UE and the network-side device in accordance with a scheduling command from the network-side device.

7. A transmission device for data transmission, comprising a processor, a memory and a transceiver, wherein the processor is connected to the transceiver and configured to read programs stored in the memory, so as to:
   perform the method according to claim 1.

8. A method for data transmission, comprising:
   determining, by a reception device, a plurality of wireless links through which data is to be transmitted between the reception device and a transmission device; and
   receiving, by the reception device, physical-layer transmission blocks including identical Medium Access Control (MAC) Protocol Data Units (PDUs) from the transmission device through the determined plurality of wireless links,
   wherein, redundancy versions of the physical-layer transmission blocks including the identical MAC PDUs are partially the same, or completely different.

9. The method according to claim 8, wherein after receiving, by the reception device, the physical-layer transmission blocks including the identical MAC PDUs from the transmission device through the determined plurality of wireless links, the method further comprises:
combining and decoding, by the reception device, the physical-layer transmission blocks received through the plurality of wireless links.

10. The method according to claim 8, wherein after receiving, by the reception device, the physical-layer transmission blocks including the identical MAC PDUs from the transmission device through the determined plurality of wireless links, the method further comprises:
transmitting, by the reception device, feedback information through at least one of the plurality of wireless links.

11. The method according to claim 8, wherein the reception device is a User Equipment (UE) and the transmission device is a network-side device, and the determining, by the reception device, the plurality of wireless links through which data is to be transmitted between the reception device and the transmission device comprises:
determining, by the UE, the plurality of wireless links through which data is to be transmitted between the UE and the network-side device in accordance with a scheduling command from the network-side device; or
the reception device is the network-side device and the transmission device is the UE, and after determining, by the reception device, the plurality of wireless links through which data is to be transmitted between the reception device and the transmission device, the method further comprises: transmitting, by the network-side device, an uplink scheduling command to the UE so as to instruct the UE to transmit data through the plurality of wireless links.

12. A reception device for data transmission, comprising a processor, a memory and a transceiver, wherein the processor is connected to the transceiver and configured to read program stored in the memory, so as to:
perform the method according to claim 8.

13. A device for data transmission, comprising one or more user-plane high-layer protocol stack units and a plurality of physical-layer units, wherein
each of the one or more user-plane high-layer protocol stack units is connected to a corresponding one of the one or more physical-layer units,
each of the one or more user-plane high-layer protocol stack units is configured to generate Medium Access Control (MAC) Protocol Data Units (PDUs) to be transmitted or receive MAC PDUs from the corresponding one of the one or more physical-layer units, and
each of the one or more physical-layer units is configured to: after being determined as a primary physical-layer unit, determine a plurality of wireless links through which data is to be transmitted between the device and a corresponding device; perform physical-layer treatment to MAC PDUs generated by the user-plane high-layer protocol stack unit corresponding to the physical-layer unit so as to generate a plurality of physical-layer transmission blocks including identical MAC PDUs, transmit all of the plurality of physical-layer blocks to other physical-layer units corresponding to the wireless links through which data is to be transmitted, and transmit one physical-layer transmission block including the identical MAC PDUs through a wireless link connected to the physical-layer unit; and after not being determined as the primary physical-layer unit, transmit the physical-layer transmission block received from the primary physical-layer unit through a wireless link connected to the physical-layer unit; or
each of the one or more physical-layer units is configured to: receive a physical-layer transmission block through a wireless link corresponding to the physical-layer unit in a plurality of wireless links through which data is to be transmitted between the device and the corresponding device, physical-layer transmission blocks transmitted through the plurality of wireless links including identical MAC PDUs; in case that the physical-layer unit is a primary physical-layer unit, receive physical-layer transmission blocks reported by other physical-layer units corresponding to other wireless links in the plurality of wireless links through which data is to be transmitted between the device and the corresponding device, combine and decode the physical-layer transmission block received by the primary physical-layer unit and the physical-layer transmission blocks reported by the other physical-layer units, and after the decoding is performed successfully, report resultant MAC PDUs to one of the one or more user-plane high-layer protocol stack units corresponding to the physical-layer unit; and in case that the physical-layer unit is not the primary physical-layer unit, report the received physical-layer transmission block to the primary physical-layer unit,
wherein, redundancy versions of the physical-layer transmission blocks including the identical MAC PDUs are partially the same, or completely different.

14. The device according to claim 13, wherein the device is a transmission device and the corresponding device is a reception device, and each of the one or more units is further configured to, in case of being determined as the primary physical-layer unit and retransmission is needed, determine whether or not there is a wireless link for which the number of retransmission times reaches a maximum value corresponding to the wireless link; and in case that there is the wireless link for which the number of retransmission times has reached the maximum value, transmit all of the physical-layer transmission blocks to the physical-layer units corresponding to the plurality of wireless links through which data is to be transmitted other than the physical-layer unit corresponding to the wireless link for which the number of retransmission times has reached the maximum value,
wherein one physical-layer transmission block is transmitted to one physical-layer unit.

15. The device according to claim 14, wherein the transmission device is a network-side device and the reception device is a User Equipment (UE), and each of the one or more physical-layer units is further configured to, after being determined as the primary physical-layer unit and before transmitting the physical-layer transmission blocks including the identical MAC PDUs to the UE through the determined plurality of wireless links, transmit a downlink scheduling command to the UE, so as to instruct the UE to receive data through the plurality of wireless links; or
the transmission device is the UE and the reception device is the network-side device, and each of the one or more physical-layer units is further configured to, after being determined as the primary physical-layer unit, determine the plurality of wireless links through which data is to be transmitted between the UE and the network-side device in accordance with a scheduling command from the network-side device.

16. The device according to claim 13, wherein the device is a reception device and the corresponding device is a transmission device, and in case that the physical-layer unit is the primary physical-layer unit, the physical-layer unit is further configured to, in accordance with a result of the combining and decoding, at least one of:
- (i) transmit feedback information through the wireless link corresponding to the physical-layer unit, or
- (ii) notify other physical-layer units to transmit feedback information through wireless links corresponding to the other physical-layer units.

17. The device according to claim 16, wherein the reception device is a User Equipment (UE) and the transmission device is a network-side device, and each of the one or more physical-layer units is further configured to determine the plurality of wireless links through which data is to be transmitted between the UE and the network-side device in accordance with a scheduling command from the network-side device; or the reception device is the network-side device and the transmission device is the UE, and each of the one or more physical-layer units is further configured to determine the plurality of wireless links through which data is to be transmitted between the network-side device and the UE, and transmit an uplink scheduling command to the UE, so as to instruct the UE to transmit data through the plurality of wireless links.

18. The device according to claim 13, wherein the device is a transmission device and the corresponding device is a reception device, and each of the one or more physical-layer units is further configured to, in case of being determined as the primary physical-layer unit and retransmission is needed, determine whether or not the number of retransmission times of the primary physical-layer unit reaches a maximum value corresponding to the primary physical-layer unit, and in case that the number of retransmission times of the primary physical-layer unit reaches the maximum value, stop the retransmission, and in case that the number of retransmission times of the primary physical-layer unit does not reach the maximum value, continue to transmit one physical-layer transmission block including the identical MAC PDUs through the wireless link connected to the physical-layer unit.

19. The device according to claim 13, wherein the one or more user-plane high-layer protocol stack units are arranged in one-to-one correspondence with the one or more physical-layer units.

20. The device according to claim 13, wherein the device comprises one user-plane high-layer protocol stack unit and at least two physical-layer units, and in case that one of the at least two physical-layer units is determined as the primary physical-layer unit, the user-plane high-layer protocol stack unit is arranged to correspond to the primary physical-layer units.

* * * * *